(12) United States Patent
Shah et al.

(10) Patent No.: US 9,134,720 B2
(45) Date of Patent: Sep. 15, 2015

(54) MACRO FUNCTION BLOCK FOR ENCAPSULATING DEVICE-LEVEL EMBEDDED LOGIC

(75) Inventors: Harsh Shah, Cleveland, OH (US); Gregory A. Majcher, Broadview Heights, OH (US); Jian Feng, Shanghai (CN); Qing Jia, Shanghai (CN); Tao Song, Shanghai (CN); Zhen Wei, Shanghai (CN); James Edward Joe, Waukesha, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 159 days.

(21) Appl. No.: 12/895,392

(22) Filed: Sep. 30, 2010

(65) Prior Publication Data

US 2011/0202688 A1    Aug. 18, 2011

Related U.S. Application Data

(60) Provisional application No. 61/304,227, filed on Feb. 12, 2010, provisional application No. 61/304,261, filed on Feb. 12, 2010, provisional application No. 61/304,275, filed on Feb. 12, 2010.

(51) Int. Cl.
*G06F 3/00* (2006.01)
*G05B 19/045* (2006.01)
*G05B 19/042* (2006.01)
*G05B 19/05* (2006.01)

(52) U.S. Cl.
CPC .......... *G05B 19/045* (2013.01); *G05B 19/0426* (2013.01); *G05B 19/056* (2013.01); *G05B 2219/23258* (2013.01); *G05B 2219/23274* (2013.01); *G05B 2219/25232* (2013.01)

(58) Field of Classification Search
USPC ........................................................ 715/704
See application file for complete search history.

(56) References Cited

U.S. PATENT DOCUMENTS

| 4,302,820 | A | * | 11/1981 | Struger et al. ................. 712/248 |
| 5,030,939 | A | | 7/1991 | Lovick |
| 5,168,441 | A | * | 12/1992 | Onarheim et al. .............. 700/17 |
| 5,524,083 | A | | 6/1996 | Horne et al. |
| 5,717,588 | A | | 2/1998 | Yamane et al. |
| 5,971,581 | A | | 10/1999 | Gretta et al. |
| 6,018,335 | A | * | 1/2000 | Onley et al. .................... 345/172 |
| 6,061,603 | A | | 5/2000 | Papadopoulos et al. |
| 6,459,557 | B1 | | 10/2002 | Haensgen et al. |
| 6,466,827 | B1 | | 10/2002 | Stine |
| 6,816,817 | B1 | | 11/2004 | Retlich et al. |
| 6,819,960 | B1 | | 11/2004 | McKelvey et al. |
| 6,832,118 | B1 | | 12/2004 | Heberlein et al. |
| 6,901,316 | B1 | | 5/2005 | Jensen et al. |

(Continued)

FOREIGN PATENT DOCUMENTS

GB        2456037 A     7/2009
WO        9836335 A2    8/1998

*Primary Examiner* — Elias Mamo
(74) *Attorney, Agent, or Firm* — Fletcher Yoder P.C.

(57) ABSTRACT

The present invention provides techniques for encapsulating device-level embedded logic into user-defined instructions using configuration software. More specifically, the disclosed embodiments enable add-on instructions for device configuration embedded logic. Programming interfaces specific to an application or device may be combined into a single instruction as a reusable Macro component that may be reused in the same or different applications or devices.

21 Claims, 27 Drawing Sheets

(56) References Cited

U.S. PATENT DOCUMENTS

| | | |
|---|---|---|
| 6,978,225 B2 | 12/2005 | Retlich et al. |
| 6,999,824 B2 | 2/2006 | Glanzer et al. |
| 7,016,744 B2 | 3/2006 | Howard et al. |
| 7,092,771 B2 | 8/2006 | Retlich et al. |
| 7,130,704 B2 | 10/2006 | McKelvey et al. |
| 7,272,457 B2 | 9/2007 | Glanzer et al. |
| 7,424,329 B2 | 9/2008 | McKelvey et al. |
| 7,486,999 B2 | 2/2009 | Glanzer et al. |
| 8,898,633 B2 | 11/2014 | Bryant et al. |
| 2003/0160782 A1* | 8/2003 | Kawai et al. .................. 345/419 |
| 2004/0221262 A1* | 11/2004 | Hampapuram et al. ....... 717/113 |
| 2004/0229657 A1* | 11/2004 | Nakanishi ..................... 455/566 |
| 2004/0243654 A1* | 12/2004 | Burr et al. ..................... 708/164 |
| 2004/0260412 A1 | 12/2004 | Yasui et al. |
| 2006/0206218 A1 | 9/2006 | Glanzer et al. |
| 2006/0253205 A1 | 11/2006 | Gardiner |
| 2008/0004727 A1 | 1/2008 | Glanzer et al. |
| 2008/0228289 A1* | 9/2008 | Hwang et al. .................... 700/3 |
| 2008/0288618 A1 | 11/2008 | Vardi et al. |
| 2008/0294986 A1* | 11/2008 | Seo et al. ....................... 715/704 |
| 2010/0131081 A1 | 5/2010 | Brown et al. |

* cited by examiner

116

| EVENT | NON-EXISTENT | CONFIGURING | READY | ACTIVE |
|---|---|---|---|---|
| POWER LOSS | NOT APPLICABLE | TRANSITION TO NON-EXISTENT | TRANSITION TO NON-EXISTENT | TRANSITION TO NON-EXISTENT |
| POWER UP AND SAVED CONFIGURATION | TRANSITION TO CONFIGURING | NOT APPLICABLE | NOT APPLICABLE | NOT APPLICABLE |
| CREATE SERVICE | IF LOGIC IS ENABLED, RETURN THE ERROR RESPONSE "DEVICE STATE CONFLICT"; OTHERWISE, CLASS INSTANTIATES AN OBJECT INSTANCE; TRANSITION TO CONFIGURING. | RETURN "OBJECT ALREADY EXISTS" ERROR RESPONSE. | RETURN "OBJECT ALREADY EXISTS" ERROR RESPONSE. | RETURN "OBJECT ALREADY EXISTS" ERROR RESPONSE. |
| GET/SET SERVICE | RETURN "OBJECT DOES NOT EXIST" ERROR RESPONSE. | VALIDATE/PROCESS REQUEST | VALIDATE/PROCESS REQUEST | VALIDATE/PROCESS REQUEST |
| APPLY MESSAGE* | NOT APPLICABLE | VALIDATE THE CURRENT CONFIGURATION; SEND SUCCESS OR ERROR RESPONSE TO LOGIC SUPERVISOR OBJECT, AND IF SUCCESS, TRANSITION TO READY. ERROR RESPONSES SHOULD RETURN ERROR CODE 0x1F AND THE ADDITIONAL ERROR CODE THAT DESCRIBES THE REASON FOR FAILURE. THE ADDITIONAL ERROR CODES ARE DEFINED IN THE LOGIC SUPERVISOR OBJECT (0x30E). | NOT APPLICABLE | NOT APPLICABLE |
| ERROR MESSAGE* | NOT APPLICABLE | NOT APPLICABLE | CONFIGURATION IS NOT CORRECT. TRANSITION TO CONFIGURING STATE. | NOT APPLICABLE |
| RUN MESSAGE* | NOT APPLICABLE | NOT APPLICABLE | CONFIGURATION HAS PASSED VALIDATION. TRANSITION TO ACTIVE. | NOT APPLICABLE |
| STOP MESSAGE | NOT APPLICABLE | NOT APPLICABLE | NOT APPLICABLE | LOGIC HAS BEEN DISABLED. TRANSITION TO CONFIGURING STATE. |
| DELETE SERVICE | RETURN "OBJECT DOES NOT EXIST" ERROR RESPONSE. | RETURN ALL INSTANCE ATTRIBUTES TO DEFAULTS, UPDATE "INSTANCE LIST," AND TRANSITION TO NON-EXISTENT. | RETURN "DEVICE STATE CONFLICT" ERROR RESPONSE. | RETURN "DEVICE STATE CONFLICT" ERROR RESPONSE. |

*THE LOGIC SUPERVISOR OBJECT (0x30E) SENDS THE APPLY MESSAGE TO ALL CURRENTLY CREATED FUNCTION BLOCK INSTANCES. EACH INSTANCE MUST VALIDATE THAT ALL REQUIRED INPUTS ARE BOUND TO EXISTING ENTITIES. IF ANY ONE INSTANCE ENCOUNTERS A PROBLEM WITH ITS CONFIGURATION, ALL LOGIC COMPONENTS WILL RECEIVE AN ERROR MESSAGE FROM THE LOGIC SUPERVISOR FORCING A TRANSITION BACK TO THE CONFIGURING STATE.

FIG. 8

| CONDITION | OUTPUT |
|---|---|
| INPUT ≥ HHLimit (INCLUDING THE CASE WHEN HLimit = HHLimit) | 0x000C |
| HLimit ≤ INPUT < HHLimit | 0x0004 |
| LLimit < INPUT < HLimit | 0x0000 |
| LLLimit < INPUT ≤ LLimit | 0x0002 |
| INPUT ≤ LLLimit (INLUDING THE CASE WHEN LLimit = LLLimit) | 0x0003 |

FIG. 32

MACRO FUNCTION BLOCK FOR ENCAPSULATING DEVICE-LEVEL EMBEDDED LOGIC

CROSS REFERENCE TO RELATED APPLICATIONS

This application is a Non-Provisional patent application claiming priority to U.S. Provisional Patent Application No. 61/304,227, entitled "Multiple Boolean Inputs and Outputs for Device Function Blocks", filed Feb. 12, 2010, U.S. Provisional Patent Application No. 61/304,261, entitled "Automatic Device Parameter Binding Method", filed Feb. 12, 2010, and U.S. Provisional Patent Application No. 61/304,275, entitled "Macro Function Block for Encapsulating Device-Level Embedded Logic", filed Feb. 12, 2010, all of which are herein incorporated by reference.

BACKGROUND

The present invention relates generally to the field of configuring logic instructions in automation devices, and more specifically to techniques for encapsulating device-level embedded logic into user-defined instructions.

Logic solving capability may be programmed into various sensor and actuator devices, such as input/output (I/O) devices, motor drives, relays, push buttons, and other automation devices to improve the performance of the devices and to enable limited but rapid response to automation needs without specific direction from a central automation controller. For example, such logic solving capability may control outputs and manage status information of the automation devices to control operation of other components directly or closely connected to the devices. The configuration of the logic solving capability may be accomplished through visual editing tools, which provide graphical interfaces for configuring functions blocks that encompass the local control functions for the devices. Such distributed control allows low-level devices to perform operations heretofore performed only by reference to logic in one or more network-connected automation controllers. Application-specific logic programming must often be performed repeatedly within devices and/or between devices. Often, there is no easy way to reduce the number of repeated programming steps.

DRAWINGS

These and other features, aspects, and advantages of the present invention will become better understood when the following detailed description is read with reference to the accompanying drawings in which like characters represent like parts throughout the drawings, wherein:

FIG. 8 is an exemplary state event matrix for the Macro function block type definition;

FIG. 32 is a list of typical conditions and outputs of an exemplary Alarm function block;

BRIEF DESCRIPTION

The present invention provides techniques for encapsulating device-level embedded logic into user-defined instructions using device configuration software. More specifically, the disclosed embodiments enable add-on instructions for device configuration embedded logic. Programming interfaces specific to an application or device may be combined into a single instruction as a reusable Macro component that may be reused in the same or different applications or devices.

DETAILED DESCRIPTION

Figure 1:
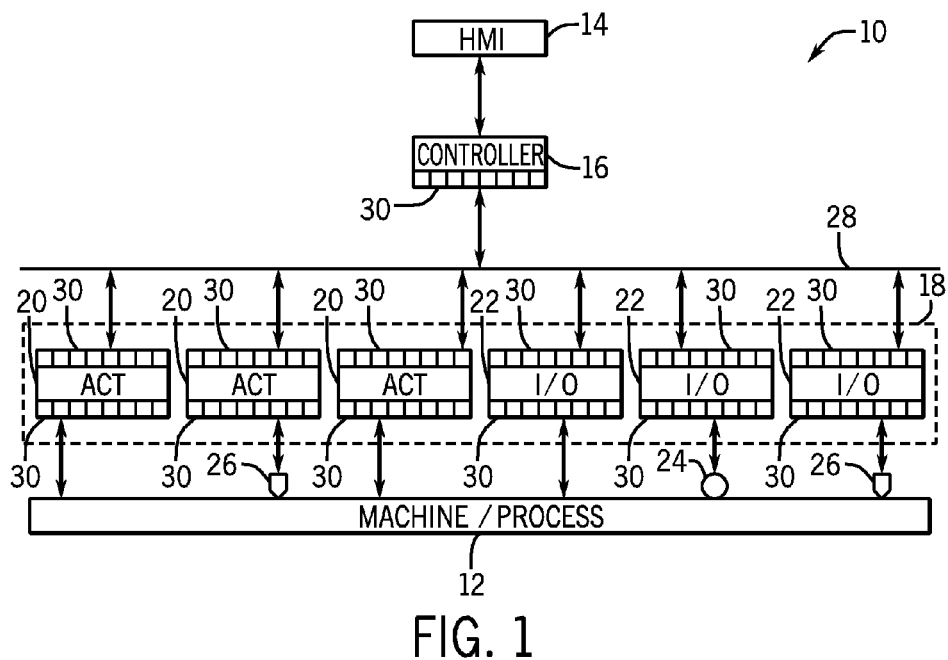
FIG. 1 is a diagrammatical representation of an exemplary control and monitoring system for controlling and monitoring a machine and/or process.

FIG. 1 is a diagrammatical representation of an exemplary control and monitoring system 10, such as for industrial automation, for controlling and monitoring a machine and/or process 12. The system 10 includes a human-machine interface (HMI) 14 adapted to collaborate with components of the machine/process 12 through an automation controller 16 (e.g., a remote computer, programmable logic controller (PLC), or other controller). The automation controller 16 is adapted to control and monitor automation devices 18, such as the actuators 20 and the input/output (I/O) devices 22 (typically sensors or I/O modules coupled to sensors) illustrated in FIG. 1. Specific examples of low-level automation devices 18 as described herein include I/O terminals, motor drives, motor starters, overload relays and other types of relays, push buttons, and so forth. The automation devices 18 may interact directly with the machine/process 12 or may interact with other automation devices 18, such as the sensors 24 and actuators 26 illustrated in FIG. 1. Collaboration between the HMI 14, the automation controller 16, and automation devices 18 of the machine/process 12 may be facilitated by using any suitable network strategies. Indeed, an industry standard network 28 may be employed, such as DeviceNet, ControlNet, Profibus, Modbus, or more common standards such as EtherNet and Internet protocols, to enable data transfer. Such networks 28 permit the exchange of data in accordance with a predefined protocol, and may also provide power for operation of networked elements.

As described in greater detail below, the automation devices 18 may include processors, memory, and low-level embedded logic to enable local (e.g., distributed) control of the automation devices 18 with or without the need to communicate with HMIs 14 or automation controllers 16 (at least prior to making a control decision). The automation devices 18 may include functionality by which they read from or write to specific memory or registers of memory. For example, the automation devices 18 may write to or read from registers 30 of one or more automation controllers 16 or even local registers 30 within the automation devices 18 (including registers within other low-level devices). In a simple case, for example, an automation device 18 may simply access a piece of data (e.g., a state of a component as determined by a sensor), and generate an output signal to write a value to one or more registers 30 corresponding to the state of a different networked device. Much more complex functionality can, of course, be configured. In an industrial control and monitoring context, for example, such automation devices 18 may emulate operation of a range of physical components, such as a momentary contact push button, a push button with delayed output, a switch, and so forth. As described in greater detail below, many pre-programmed device elements (e.g., function blocks) may be available for use by the automation devices 18. Such function blocks may be accessible via a network, or may be resident on the automation devices 18.

Figure 2:
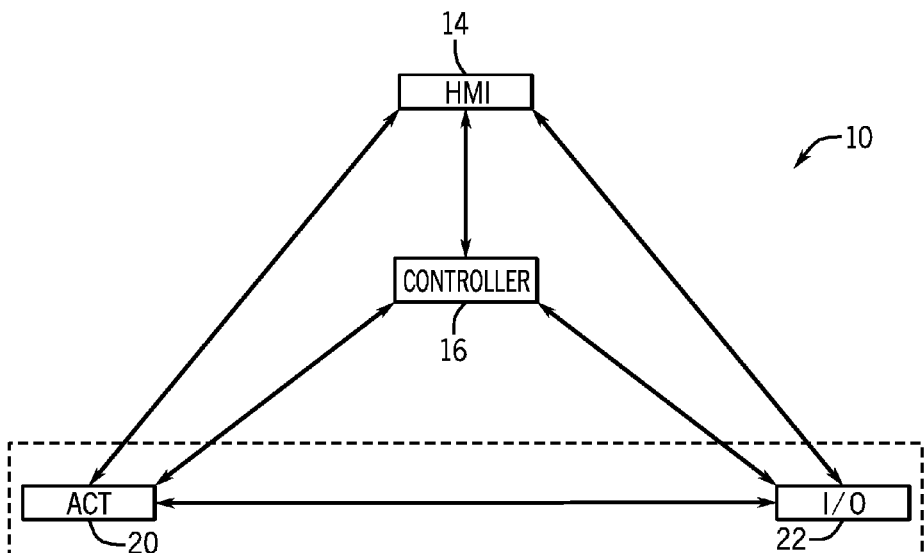
FIG. 2 is a diagrammatical representation of relationships of the exemplary control and monitoring system of FIG. 1.

FIG. 2 is a diagrammatical representation of relationships of the exemplary control and monitoring system 10 of FIG. 1. As illustrated, the HMIs 14, automation controllers 16, actuators 20, and I/O devices 22 form a somewhat triangular hierarchical relationship, with the automation controllers 16 in the center of hierarchy, and the automation devices 18 (e.g., the actuators 20 and the I/O devices 22) at the lower end of the hierarchy. As illustrated, all of the components of the control and monitoring system 10 may communicate with each other, but the low-level automation devices 18 typically receive commands from the automation controllers 16 and/or the HMIs 14. However, the disclosed embodiments enable more robust distributed control of the automation devices 18 by embedding low-level logic directly into the automation devices 18 such that they are capable of making low-level computations and decisions without the need to communicate with the HMIs 14 or the automation controllers 16, at least before the computations and decisions are made, and may output signals generated by the computations and decisions without specific commands from the automation controller 16 or the HMI 14. In other words, the disclosed embodiments enable component level devices, component class devices, architecture level devices, and architecture class devices (e.g., I/O terminals, motor drives, motor starters, overload relays and other types of relays, push buttons, and so forth) to be embedded with low-level automation control logic. This proves advantageous, for example, when the network 28 described in FIG. 1 is experiencing temporary communication problems, or simply when local computations and decisions are desirable.

Figure 3:
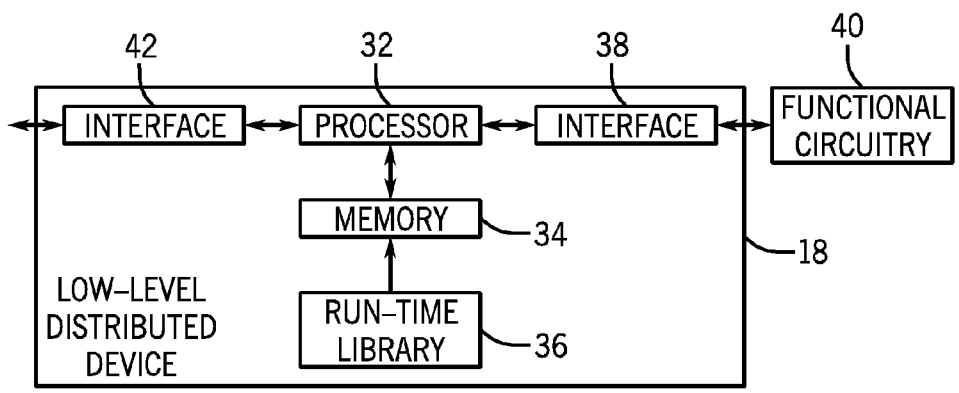
FIG. 3 is a block diagram of components of an exemplary automation device.

FIG. 3 is a block diagram of components of an exemplary automation device 18. As illustrated, each automation device 18 may comprise a configurable tool built around a microprocessor 32. In addition to the processor 32, the illustrated embodiment includes a memory module 34, which may store data and routines (e.g., computer programs) and components such as a run-time library 36 that includes the pre-programmed device elements (e.g., function blocks) described above. The memory module 34 may also include configuration information for the respective automation device 18. For example, as described in greater detail below, each automation device 18 may be configured with a specific combination of function blocks such that the automation device 18 may be capable of performing certain functions locally for the machine/process 12. In particular, the processor 32 is configured to execute the function blocks such that the low-level distributed control functions are performed by the automation device 18.

As described below, a configuration station may be used to write (i.e., download) the specific combination of function blocks to the automation device 18. Conversely, as also described below, the specific combination of function blocks may be read (i.e., uploaded) from the automation device 18 by configuration software of the configuration station. The function blocks are non-transitory code configured in an object oriented programming language. Certain of the function blocks may be configured to read at least one input from and/or write at least one output to one or more of the registers 30 described above. As described below, in a present embodiment, the function blocks themselves comprise objects defined in an object oriented language. Such objects will typically be defined by code that establishes data structures consisting of data fields and methods. The fields may themselves define the properties of the object, while the methods define operations performed by the object during real-time operation of the automation system. The resulting objects form self-sufficient modules that can read from particular memory addresses (e.g., registers 30), write to particular memory addresses, receive inputs (e.g., from sensors), and output signals (e.g., to actuators) based upon their own data structures and methods.

Each automation device 18 also includes a first interface 38 for communicating with functional circuitry 40, such as low-level sensors that provide sensor readings as inputs, low-level actuators that accept outputs generated by the function blocks executed by the processor 32, and so forth. In addition, the automation device 18 also includes a second interface 42 for communicating with a configuration station during configuration of the automation device 18 and/or for communicating with HMIs 14 and/or automation controllers 16 during operation of the automation device 18.

Figure 4:
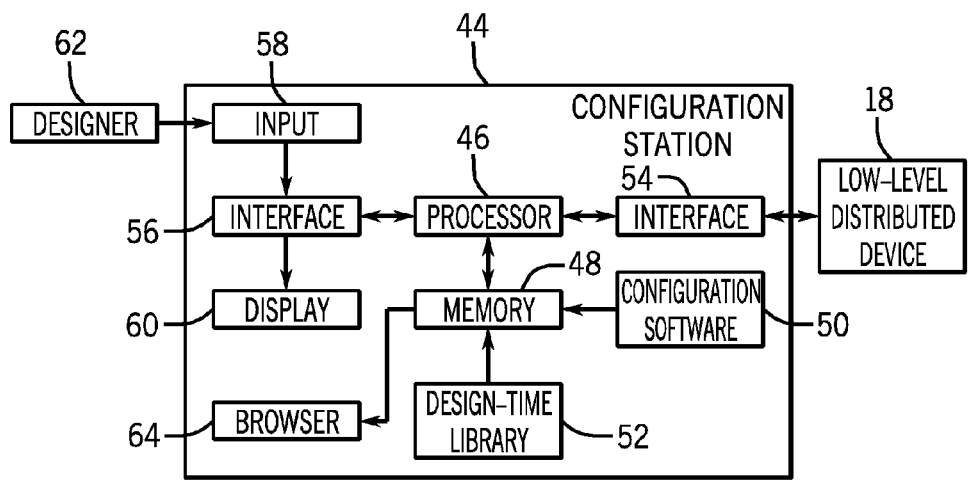
FIG. 4 is a block diagram of components of an exemplary configuration station for configuring the automation devices of FIG. 3.

FIG. 4 is a block diagram of components of an exemplary configuration station 44 for configuring the automation devices 18 of FIG. 3. As illustrated, the configuration station 44 may include configuration software executed by a processor 46. In addition to the processor 46, the illustrated embodiment includes a memory module 48, which may store computer programs and components such as configuration software 50 and a design-time library 52 that includes the pre-programmed device elements (e.g., function blocks) described above. The configuration station 44 is capable of configuring the automation devices 18 with specific combinations of function blocks such that the automation devices 18 may be capable of performing certain functions locally for the machine/process 12. The configuration software may be installed on the configuration station 44 (e.g., as a stand-alone application), or may be accessed by any of a range of remote data exchange schemes (e.g., through a computer browser). Moreover, in some implementations, the configuration or design-time environment may be served to the configuration station 44 by the automation device 18 (e.g., by a server application operative on the automation device 18). In a presently contemplated embodiment, the configuration software 50 may include or be based upon a product available commercially under the designation RSNetWorx, from Rockwell Automation, Inc. of Milwaukee, Wis.

In particular, the configuration station 44 may be used to write, adapt, and load (i.e., download) a specific combination of function blocks to a specific automation device 18. Conversely, a specific combination of function blocks may be read (i.e., uploaded) from automation devices 18 by the configuration software 50 of the configuration station 52. Again, in a presently contemplated embodiment, the function blocks are non-transitory code configured in an object oriented programming language. Certain of the function blocks are configured to read at least one input from and/or write at least one output to one or more of the registers 30 described above.

The configuration station 44 also includes a first interface 54 for communicating with the automation devices 18, such that the configuration station 44 can write a specific combination of function blocks to a specific automation device 18 and read a specific combination of function blocks from a specific automation device 18. In addition, the configuration station 44 also includes a second interface 56 for communicating with an input device 58 and a display 60, which are used to receive inputs from a designer 62 (e.g., a user that configures the automation device 18 with the specific combination of function blocks) and visually display configuration information for the automation device 18, respectively. In particular, in certain embodiments, a browser 64 configured to display a visual representation of the function blocks for a specific automation device 18 may be displayed by the display 62. It should be noted that reference to a "browser" for viewing and modifying configuration of the automation devices 18 is not limited to web browsers or to any particular browser. References to the browser 64 are merely intended to be exemplary. More generally, the term "browser" is utilized herein to reference software which includes any general purpose viewer.

Figure 5:
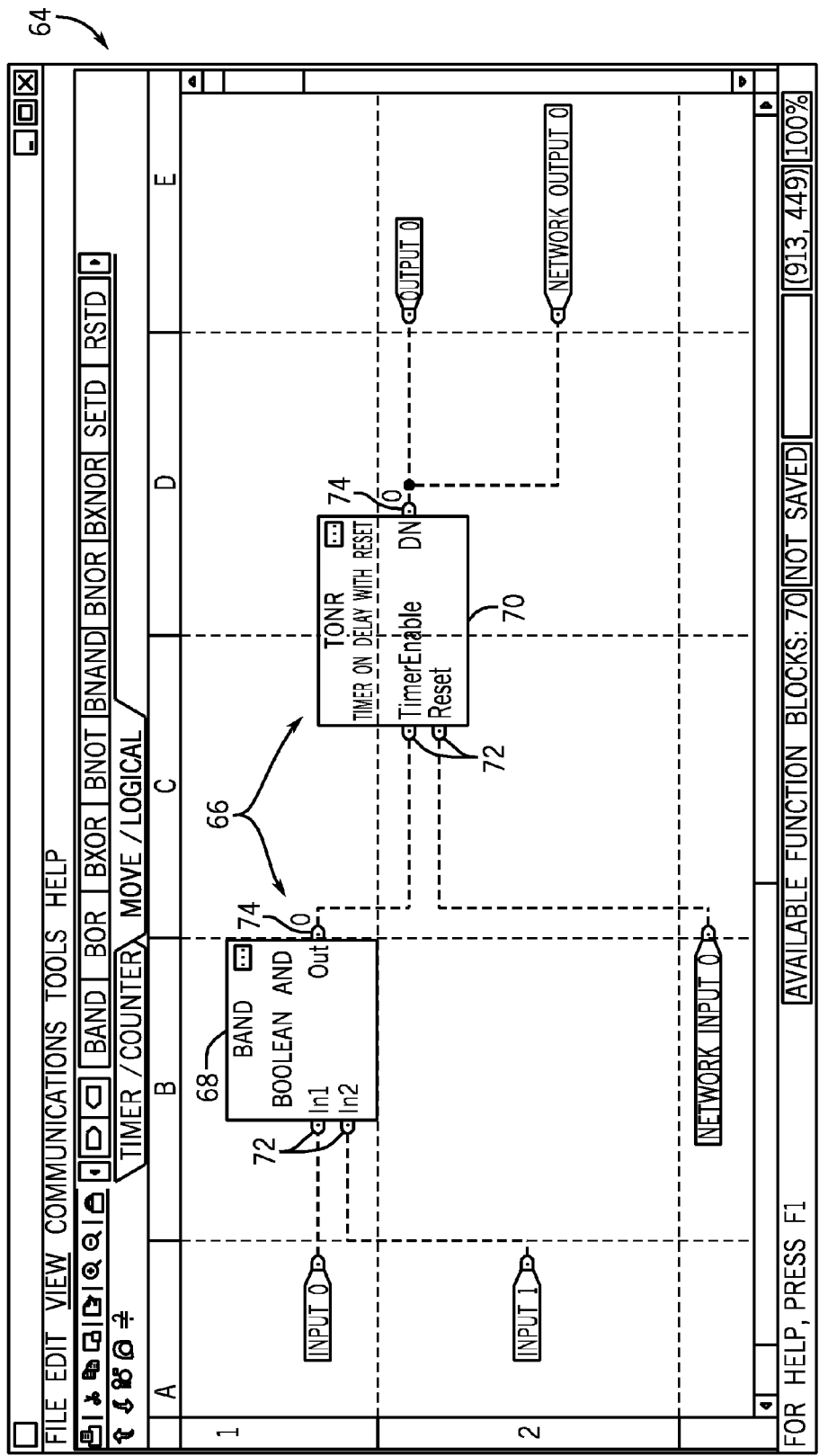
FIG. 5 is a visual representation of an exemplary browser of FIG. 4 for visually displaying the configuration of a particular automation device.

FIG. 5 is a visual representation of an exemplary browser 64 of FIG. 4 for visually displaying the configuration of a particular automation device 18. In particular, the browser 64 displayed in FIG. 5 may be referred to as a function block editor. As illustrated, the particular automation device 18 being configured includes two function blocks 66 (i.e., a Boolean And (BAND) function block 68 and a Timer On Delay with Reset (TONR) function block 70). As illustrated, the BAND function block 68 is configured to receive two inputs 72 and output one output 74. The two inputs 72 into the BAND function block 68 may, for example, be values read from a register 30. In the particular configuration illustrated in FIG. 5, the BAND function block 68 acts upon the two received inputs 72 and outputs the output 74, which is received by the TONR function block 70 as a first input 72 (e.g., TimerEnable). As illustrated, the TONR function block 70 also receives a second input 72 (Reset) from a network-linked source. The TONR function block 70 acts upon the two inputs 72 and outputs a single output 74. As illustrated, the single output 74 from the TONR function block 70 may, for example, be written to a register 30 as well as be sent to a network-linked source. The specific combination of function blocks 66 illustrated in the browser 64 of FIG. 5 are merely exemplary and not intended to be limiting. Although illustrated as only having two function blocks 66, numerous different function blocks 66 may be used for any given automation device 18. Indeed, the design-time library 52 used by the configuration software 50 of FIG. 4 (and, similarly, the run-time library 36 installed in the automation device 18) may include hundreds of different types of function blocks 66 including, for example, Boolean function blocks (e.g., AND, OR, XOR, NAND, NOR, XNOR, and so forth), bistable function blocks (e.g., RS Latch, SR Latch, and so forth), counter/timer function blocks (Up Counter, Up-Down Counter, Pulse Timer, On Delay Timer, Off Delay Timer, and so forth), and various other types of function blocks.

The disclosed embodiments enable multiple function blocks 66 to be combined into a single Macro function block for re-use. In particular, a Macro function block creation module of the configuration software 50 of FIG. 4 may be used as a design environment for creating the Macro function blocks. A Macro function block may be defined as an entity that is composed of a group of component function blocks 66.

All of the component function blocks 66 work together to complete one comparatively complex task in the form of the Macro function block. When the Macro function block has been defined, designers 62 may apply an instance of the Macro function block object in the configuration software 50. In other words, the disclosed embodiments enable the encapsulation of multiple function blocks 66 into a single Macro function block as add-on instructions for use in multiple automation devices 18. The parameters of the internal function blocks 66 may be mapped to the inputs and outputs of the Macro function block, such that these parameters are accessible not only for other portions of the logic of a particular automation device 18, but for other automation devices 18 as well. For example, in certain embodiments, the Macro function blocks may be stored in the run-time library 36 of a particular automation device 18, stored in the design-time library 52 of a particular configuration station 44, distributed and stored on multiple automation devices 18, distributed and stored on multiple configuration stations 44, so forth. Indeed, as described in greater detail below, the Macro function blocks may be uploaded and downloaded to and from any number of automation devices 18 using the configuration software 50.

Figure 6:
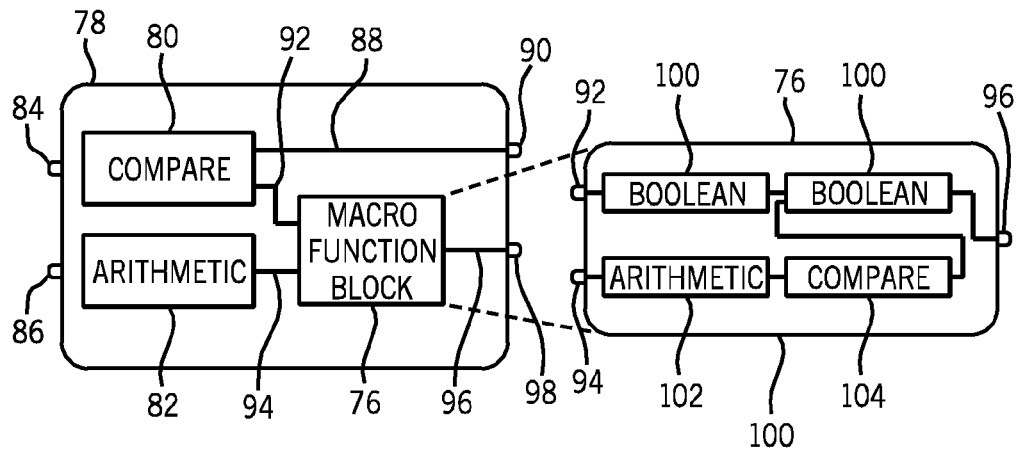
FIG. 6 is a block diagram of an exemplary Macro function block used with other function blocks.

FIG. 6 is a block diagram of an exemplary Macro function block 76 used with other function blocks 66. As illustrated in FIG. 6, the main logic 78 of a given automation device 18 includes a Compare function block 80, an Arithmetic function block 82, and the Macro function block 76. The Compare function block 80 receives a first input 84 of the main logic 78 and the Arithmetic function block 82 receives a second input 86 of the main logic 78. A first output 88 from the Compare function block 80 is a first output 90 of the main logic 78. A second output 92 from the Compare function block 80 is directed into the Macro function block 76. A sole output 94 from the Arithmetic function block 82 is also directed into the Macro function block 76. A sole output 96 from the Macro function block 76 is a second output 98 from the main logic 78.

As illustrated, the exemplary Macro function block 76 of FIG. 6 includes two Boolean function blocks 100, an Arithmetic function block 102, and a Compare function block 104. These function blocks act upon the second output 92 from the Compare function block 80 of the main logic 78 and the sole output 94 from the Arithmetic function block 82 of the main logic 78 to generate the second output 98 from the main logic 78. The use of the two Boolean function blocks 100, the Arithmetic function block 102, and the Compare function block 104 in the exemplary Macro function block 76 of FIG. 6 illustrates the relatively complex functionality that can be programmed into the Macro function block 76 using relatively fundamental function blocks 66 (e.g., the two Boolean function blocks 100, the Arithmetic function block 102, and the Compare function block 104). In addition, the exemplary Macro function block 76 may be saved and reused in other automation devices 18.

The types of Macro function blocks 76 may be classified in two categories, Dynamic and Static. Dynamic Macro function blocks 76 are defined by designers 62 by operating the browser 64 described above with respect to FIG. 4. Designers 62 may program the logic, define I/O, configure the parameters, and so forth, for the definition of a Macro function block type using these visual editing tools of the configuration software 50. Static Macro function blocks are defined by designers 62 when the automation device 18 is under development. Designers 62 may not change these definitions, but may only utilize them in the main logic of automation devices 18, and view the logic if passing the security checking.

Macro Function Block Class Attributes

The Macro function block object may be defined by various class attributes. In a particular embodiment, Attribute IDs 1-23 may be used. Attribute IDs 1-7 may be optional. Attribute 8 may be named "Instance List," and may be a required "Get" attribute, which returns a structure containing the number of created instances and an array of their instance numbers. Attribute 9 may be named "Type List," and may be a required "Get" attribute, which returns a structure containing the number of defined Macro function block types and an array of their type IDs. Attributes 10 and 11 may not be defined.

Attribute 12 may be named "FB Output List," and may be a conditional "Get" attribute that returns a structure with detailed descriptions and parameters (e.g., a function block index, the name defined for each output, a reference number "n" for the FUNCTION_BLOCK_OUTPUT_n output to cross-reference the entry to the corresponding electronic data sheet (EDS) Binding Path entry, an interpretation option for use with the EDS file, and an offset index for use with the EDS file) for each function block (FB) output. The "conditional" nature of Attribute 12 is that it may be required if the automation device 18 does not support EDS files. The members of this structure are intended to replace the information that would otherwise appear in the EDS entries 1_FUNCTION_BLOCK_OUTPUT_n and 1_FB_OUTPUT_LIST. Attributes 13-20 may not be defined.

Attribute 21 may be named "Maximum Number of Instances," and may be an optional "Get" attribute, which returns the maximum number of Macro function block instances that can be created. Attribute 22 may be named "Maximum Number of Types," and may be an optional "Get" attribute, which returns the maximum number of different Macro function block types that can be created. Attribute 23 may be named "Type Configuration Description," and may be an optional "Get" attribute that returns an array list of the description on the specified type configuration. The size of the array list should be equal to the class Attribute 22 ("Maximum Number of Types"). The array list may contain, for example, the Macro function block type ID, the usage classification (e.g., 0—Dynamic, 1 —Static, Other—not defined), the corresponding file instance to store the type definition, the maximum size of memory (e.g., in bytes) reserved for the specified file instance, and the maximum size of a single packet (e.g., in bytes) that can be accepted for the specified file instance.

Semantics of Macro Function Block Class Attributes

FUNCTION BLOCK OUTPUT LIST, ATTRIBUTE 12—This attribute provides a structure detailing the function block outputs possible with this object. Each possible output is assigned a unique number that is reflected in the "FB Output Index" structure member. The configuration software 50 of FIG. 4 can display each output name as described in the "FB Output Name String" member. For consistency among automation devices 18, all products may use the strings defined herein. If the product uses an EDS file, the EDS file may also use the strings defined here. The "Reference Number" member of the structure indicates which binding path section should be referenced for each output. The keyword for a binding path section is 1_FUNCTION_BLOCK_OUTPUT_n, where n is the Reference Number member. This allows function block outputs of similar data types to be grouped together in the same data table. "Interpretation Option" indicates how the FB Output Index Number should be interpreted. The following values are defined: 0—the FB Output Index Number may be interpreted as the function block's instance number, 1—the FB Output Index Number has no specific meaning, and 2—the FB Output Index Number may be interpreted as the function block's process order. The "Offset Index" member corresponds to the Member ID field in the referenced 1_FUNCTION_BLOCK_OUTPUT_n entry. The index provides for the case where one function block has multiple pieces of data within the same binding path section. As described above, attribute 12 is required when this information is not made available via an EDS.

MAXIMUM NUMBER OF INSTANCES, ATTRIBUTE 21—This attribute is used to indicate the maximum number of Macro function blocks 76 that are allowed to be created in a particular automation device 18 due to the limitation of the resources. If this attribute is not supported, the limitation for the number of instances will be determined dynamically in the automation device 18.

MAXIMUM NUMBER OF TYPES, ATTRIBUTE 22—This attribute is used to indicate the maximum number of the type of Macro function blocks 76 that are allowed to be registered due to the limitation of the resources. If this attribute is not supported, the limitation for the number of Macro function block type will be determined dynamically in the automation device 18. Valid type identifiers should be from 1 to the value of this attribute.

TYPE CONFIGURATION DESCRIPTION, ATTRIBUTE 23—This attribute is used to provide the on-line EDS capability information for the Macro function block specific EDS entries Static_Type_Configuration_List and Dynamic_Type_Configuration_List in the section [1_MACRO_BLOCK]. TypeID is the supported Macro function block type ID, Classification is an indication of the type classification, File Instance is the corresponding file instance pre-assigned for the specific type ID, Max Size of File is the maximum size of the file in bytes, and Max Size of Single Packet is the maximum size of the each packet for operating the file instance.

Macro Function Block Instance Attributes

Each Macro function block instance may be defined by various instance attributes. In a particular embodiment, Attribute IDs 1-23 may be used. Attribute 1 may be named "Instance Type," and may be a required "Set" attribute for setting the type of the created Macro function block 76. Attributes 2-19 may not be used. Attribute 20 may be named "Enable in Binding Path," and may be an optional "Set" attribute for setting a structure containing the size of the member path (e.g., in bytes), the member path (e.g., a packed EPATH), and a flag indicating if the input should be complemented. The complement flag indicates whether the true data or the complement of the data referenced by the path should be used. Attribute 21 may be named "Enable In Constant Value," and may be an optional "Set" attribute for setting a constant value for use as the Enable In. Attribute 22 may be named "Enable Out," and may be an optional "Get" attribute, which returns the enabled state for output. Attribute 23 may be named "Process Order," and may be a required "Set" attribute for setting the initial sequence number of logic processing for the component function blocks 66 inside the Macro function block instance.

Semantics of Macro Function Block Instance Attributes

INSTANCE TYPE ID, ATTRIBUTE 1—This attribute is used to indicate the type of the created instance. When the request is received to set the value of this attribute, it should verify if the value of type identifier has been created. If the requested type is not created, the error INVALID_ATTRIBUTE_VALUE (0x09) may be returned.

ENABLE IN BINDING PATH, ATTRIBUTE 20—The Enable In Binding Path attribute contains a path to the source of information to be used for Enable In along with an indication of whether the data should be complemented. The source may be a Boolean entity. The only valid segment types for this attribute are Port, Logical, and Symbolic. Within logical segments, the Electronic Key and 8-bit Service ID Segments may be invalid.

ENABLE IN CONSTANT VALUE, ATTRIBUTE 21—The value of Enable In to be operated on is determined by the Enable In Binding Path and Enable In Constant Value attributes. If the Enable In Binding Path is Null, the Enable In Constant Value may be used in the operation. If the Enable In Binding Path is non-Null, then the value of the bound path may override the Enable In Constant Value and be used for the logic operation. The value of Enable In will be used to decide if the function block 66 starts to execute. If its value is 0 (Clear), the function block 66 does not execute and outputs are not updated. If its value is 1 (Set), the function block 66 will execute.

ENABLE OUT, ATTRIBUTE 22—This attribute can be used to cascade the Enable signal between the function blocks 66 to control the logic execution. The value of Enable Out is determined by the value of Enable In. If the value of Enable In is 1, then the value of Enable Out will be 1; otherwise, if the value of Enable In is 0, then the value of Enable Out will be 0.

PROCESS ORDER, ATTRIBUTE 23—Each Macro function block instance contains multiple component function blocks 66. Each component function block 66 will have its own process number consecutively within the scope of the Macro function block instance. The Process Order attribute utilizes the lowest process number of the component function blocks 66 to indicate the Macro function block instance's process order.

Common Services

The Macro function block object provides numerous common services. In a particular embodiment, the Macro function block object may include a service named Reset, which may be used to reset all the configurations for Macro type configurations, Macro instance configurations, and so forth. The Macro function block object may also include a service named Create, which may be used to instantiate an object. The response may contain the instance number. The Macro function block object may further include a service named Delete, which may be used to delete a specific instance. In addition, the Macro function block object may include a service named Get_Attribute_Single, which may return the value of the specified attribute. The Macro function block object may also include a service named Set_Attribute_Single, which may be used to modify an attribute value.

Request and Response Parameters for Common Services

RESET SERVICE (0X05) REQUEST PARAMETERS—No extra request parameters are needed for the Reset service.

RESET SERVICE (0X05) RESPONSE PARAMETERS—No parameters are returned with a success response.

CREATE SERVICE (0X08) REQUEST PARAMETERS—The Create service may include an Instance Number request parameter, which defines the requested instance number.

CREATE SERVICE (0X08) RESPONSE PARAMETERS—The Create service may include an Instance Number response parameter. If the Create request is successfully serviced, the instance number may be returned in the response message.

DELETE SERVICE (0X09) REQUEST PARAMETERS—No extra request parameters are needed for the Delete Service.

DELETE SERVICE (0X09) RESPONSE PARAMETERS—No parameters are returned with a success response.

Object-Specific Services

The Macro function block object provides an object-specific service named Process_Macro_Encap_Message, which may be used to process the encapsulated explicit request message for the configuration of Macro function block type definition. This service is used to perform services on, or access the attributes of, the component function blocks 66 within an instantiated Macro function block 76.

Request and Response Parameters for Object-Specific Services

Process_Macro_Encap_Message Service (0x4D) Request Parameters—The Process_Macro_Encap_Message service may include a Service ID request parameter, which is a service code encapsulated in the message. The Process_Macro_Encap_Message service may also include a Service Optional Data service, which is the data dependent on the Service ID. The Service ID parameter specifies the encapsulated service that is to be performed by the target of the request. The values for the supported Service IDs may include Create (i.e., create the component function block 66), Delete (i.e., delete the component function block 66), Get_Attribute_Single (i.e., get the attribute value of the component function block 66), and Set_Attribute_Single (i.e., set the attribute value of the component function block 66).

Each valid Service ID in the table may include a Service Optional Data value. For example, the Create (0x08) Service Optional Data may include a Class ID parameter, which is the class ID for the created component function block 66. In addition, the Create (0x08) Service Optional Data may include a Process Order parameter, which is a process sequence ID in the overall logic program. The Delete (0x09) Service Optional Data may include a Class ID parameter, which is the class ID for the created component function block 66. In addition, the Delete (0x09) Service Optional Data may include a Process Order parameter, which is the process order of the component function block 66 to be deleted. The Get_Attribute_Single (0x0E) Service Optional Data may include a Class ID parameter, which is the class ID for the created component function block 66. In addition, the Get_Attribute_Single (0x0E) Service Optional Data may include a Process Order parameter, which is the process order of the component function block 66. Further, the Get_Attribute_Single (0x0E) Service Optional Data may include an Attribute ID parameter, which is the attribute ID to be read from the component function block 66. The Set_Attribute_Single (0x10) Service Optional Data may include a Class ID parameter, which is the class ID for the created component function block 66. In addition, the Set_Attribute_Single (0x10) Service Optional Data may include a Process Order parameter, which is the process order of the component function block 66. Further, the Set_Attribute_Single (0x10) Service Optional Data may include an Attribute ID parameter, which is the attribute ID to be set in the component function block 66. The Set_Attribute_Single (0x10) Service Optional Data may also include an Attribute Value parameter, which depends on the data type of the specified attribute.

Macro Type Definition Behavior

Figure 7:
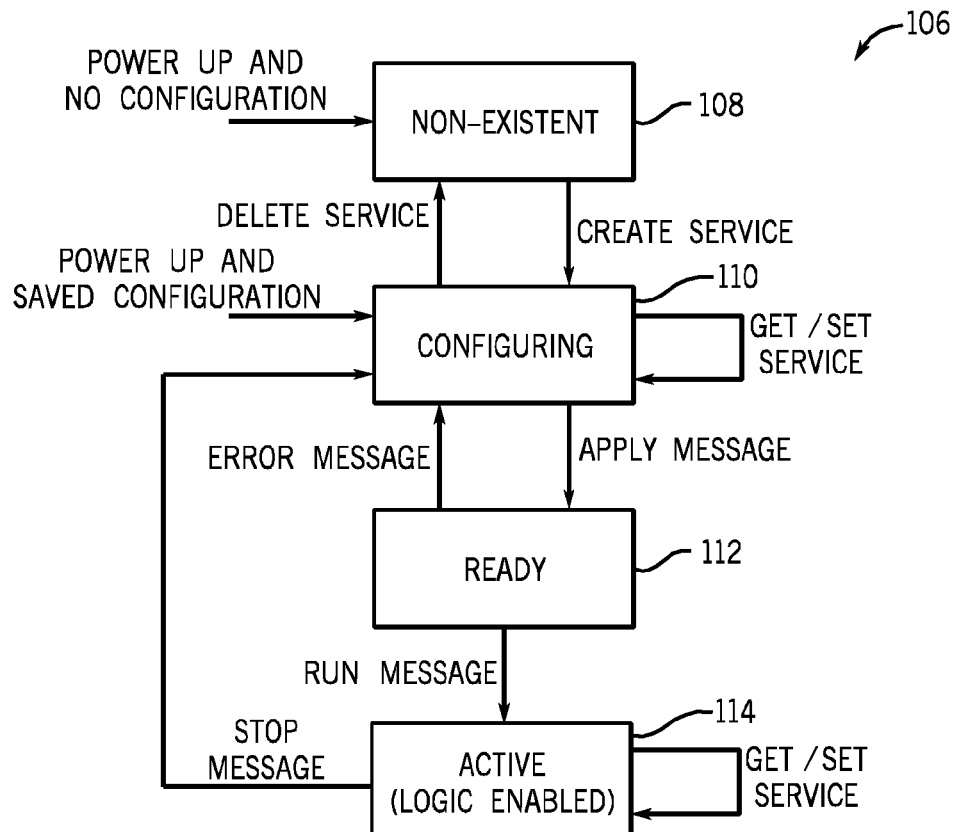
FIG. 7 is an exemplary state transition diagram illustrating states during configuration of the automation device.

FIG. 7 is an exemplary state transition diagram 106 illustrating states during configuration of the automation device 18. FIG. 7 illustrates the following states: (1) Non-Existent 108 (e.g., the automation device 18 is without power or an instance that has not yet been created), (2) Configuring 110 (e.g., the instance exists and is capable of being configured), (3) Ready 112 (e.g., the Logic Supervisor Object (0x30E) initiated the Apply service and this instance passed validation and is awaiting further events), and (4) Active 114 (e.g., this instance is executing its logic).

The Macro function block type definition state events may include Power Loss (e.g., power is removed from the automation device 18), Power Up AND Saved Configuration (e.g., power is applied to the automation device 18 and the automation device 18 reads its non-volatile storage), Create Service (e.g., the service was received), Get/Set Service (e.g., a request was received to get or set an attribute, parameter, or other setting), Apply Message (e.g., an internal message sent by the Logic Supervisor object (0x30E) causing the instance to validate its current configuration), Error Message (an internal message sent by the Logic Supervisor object (0x30E) indicating that an Apply request has failed), Run Message (e.g., an internal message sent by the Logic Supervisor object (0x30E) directing the instance to enter the Active state 114), Stop Message (e.g., an internal message sent by the Logic Supervisor object (0x30E) directing the instance to return to the Configuring state 110), and Delete Service (e.g., the Delete service or the Reset service was received). The effect of the Macro function block type definition state events depend on the current state of FIG. 7. FIG. 8 is an exemplary state event matrix 116 for the Macro function block type definition.

The instance attributes Instance Type and Enable In Binding Path may only be set in the Configuring state 110. If a request is received to set these attributes in any other state, the "Object State Conflict" error response should be returned. Other settable attributes can be set in the Active state 114 as well as in the Configuring state 110.

Use Case: Macro Function Block Visibility

Figure 9:
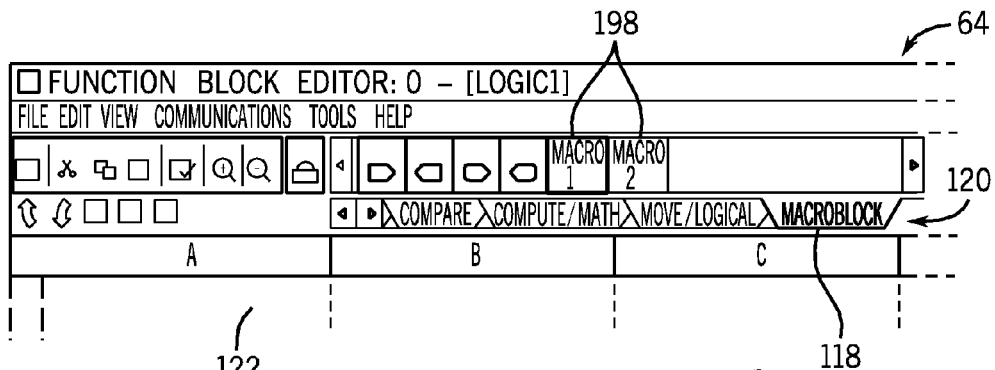
FIG. 9 is a partial screenshot of the browser of FIG. 4 illustrating a new Macro Block tab.

FIG. 9 is a partial screenshot of the browser 64 of FIG. 4 illustrating a new Macro Block tab 118. The browser 64 functions as a Macro function block creation module in a design environment, which enables a designer 62 to create Macro function blocks 76 and configure specific Macro function blocks 76 for a particular automation process (e.g., the machine/process 12 of FIG. 1). As illustrated, the new Macro Block tab 118 appears in the Instruction Toolbar 120 as a new category. In particular, the Macro Block tab 118 lists all of the currently available Macro function blocks 76 in the project. If there are no available Macro function block instructions that have been defined, there are no buttons available when the designer 62 chooses the Macro Block tab 118. If a Macro function block 76 has not been completely defined, the corresponding button on the Instruction Toolbar 120 is disabled, and that Macro function block 76 may not be dragged into the main logic editing window 122.

Figure 10:
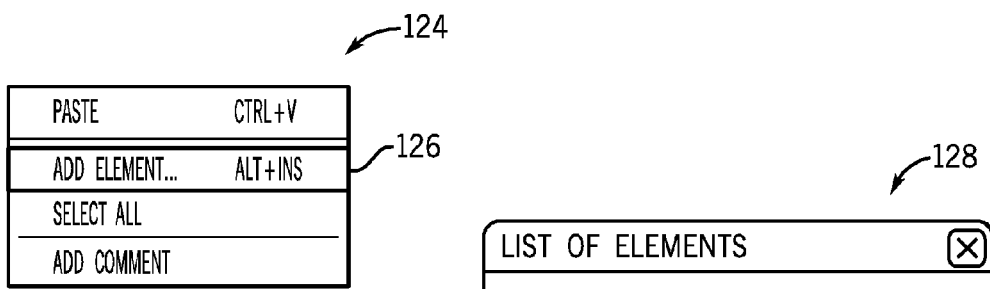
FIG. 10 is an exemplary pop-up menu that enables the designer of the automation device to select an Add Element menu item.
Figure 11:
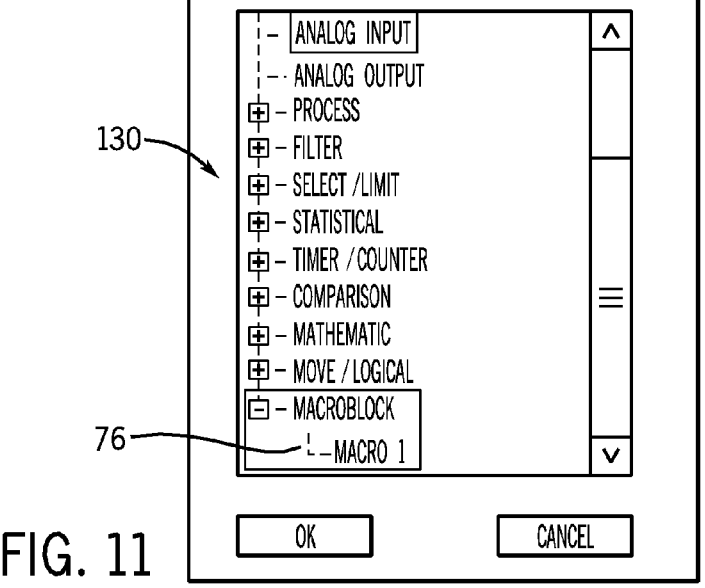
FIG. 11 is an exemplary element list dialog that is launched when the designer selects the Add Element menu item of FIG. 10.
Figure 12:
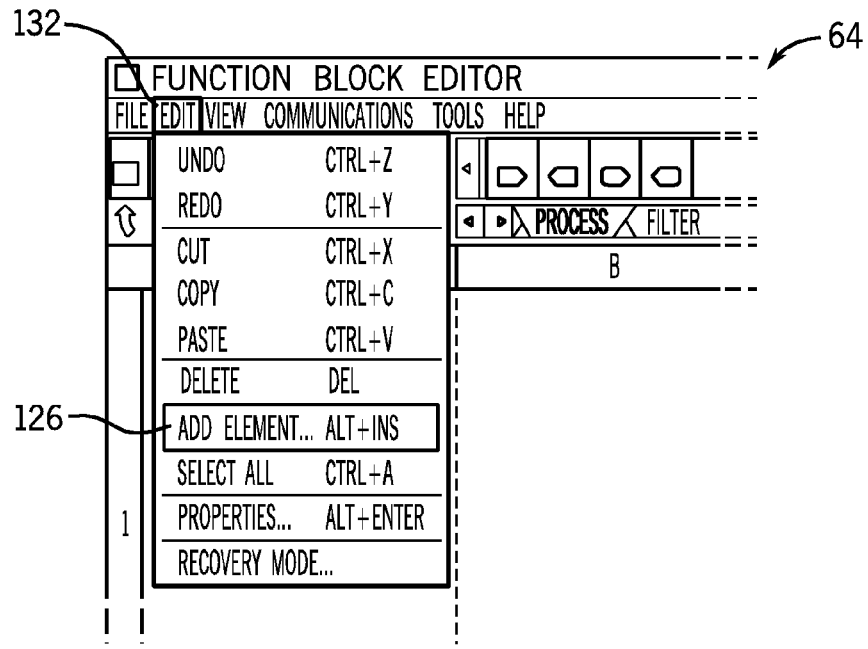
FIG. 12 is a partial screenshot of the browser of FIG. 4 illustrating the Add Element menu item being selected by the designer from a main Edit menu.

FIG. 10 is an exemplary pop-up menu 124 that enables the designer 62 of the automation device 18 to select an Add Element menu item 126. The designer 62 may right-click the mouse on the main logic editing window 122, causing the menu 124 to pop up. The designer 62 may then click the Add Element menu item 126. When doing so, an element list dialog will be launched. FIG. 11 is an exemplary element list dialog 128 that is launched when the designer 62 selects the Add Element menu item 126 of FIG. 10. The element list dialog 128 illustrates normal use of logic elements 130 during logic creation. The element list dialog 128 lists all available Macro function block 76, as well as other logic elements 130, that have been completely defined. In the element list dialog 128, the designer 62 may select a Macro function block 76 to create a Macro function block instance. Besides the option of the pop-up menu 124 to add the element, the designer 62 may also select the Add Element menu item 126 through a main Edit menu of the browser 64. FIG. 12 is a partial screenshot of the browser 64 of FIG. 4 illustrating the Add Element menu item 126 being selected by the designer 62 from a main Edit menu 132.

Use Case: Define Macro Function Block

Figure 13:
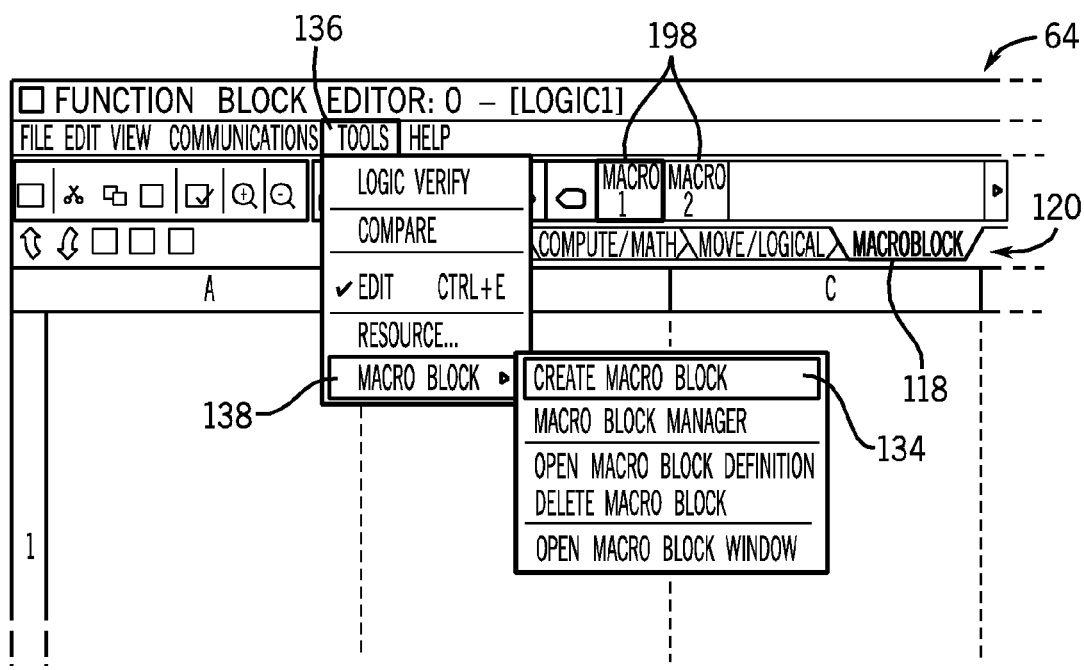
FIG. 13 is a partial screenshot of the browser illustrating the designer clicking a Create Macro Block sub-menu item from a main Tools menu and a Macro Block sub-menu under the main Tools menu.
Figure 14:
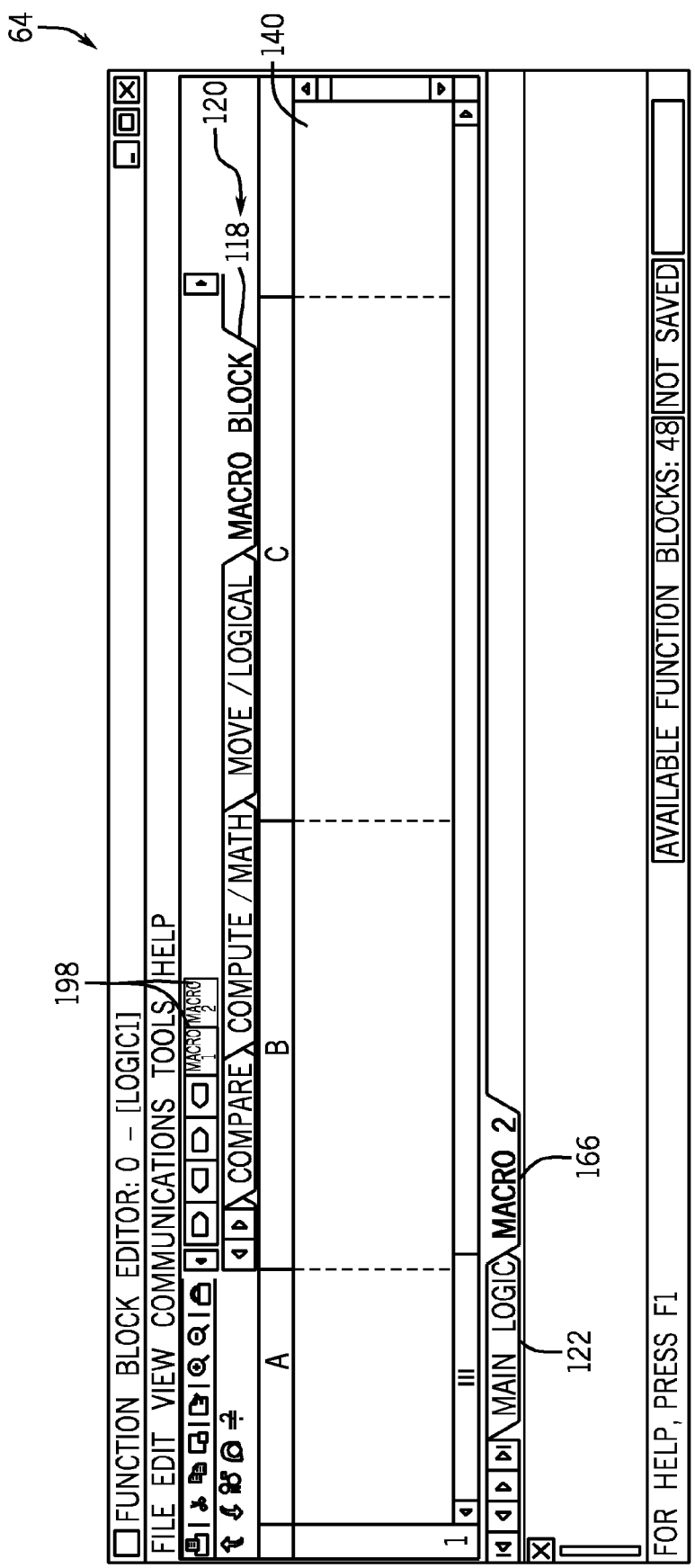
FIG. 14 is a partial screenshot of the browser illustrating a Macro function block editing window, which may be used for editing Macro function blocks.

The designer 62 may use the browser 64 in Editing mode to define a Macro function block 76. In particular, FIG. 13 is a partial screenshot of the browser 64 illustrating the designer 62 clicking the Create Macro Block sub-menu item 134 from a main Tools menu 136 and a Macro Block sub-menu 138 under the main Tools menu 136. When this is done, a tabbed window for Macro function block 76 editing is created. FIG. 14 is a partial screenshot of the browser 64 illustrating the Macro function block editing window 140, which may be used for editing Macro function blocks 76. The main logic editing window 122 and the Macro function block editing window 140 may be available at the same time.

Figure 15:
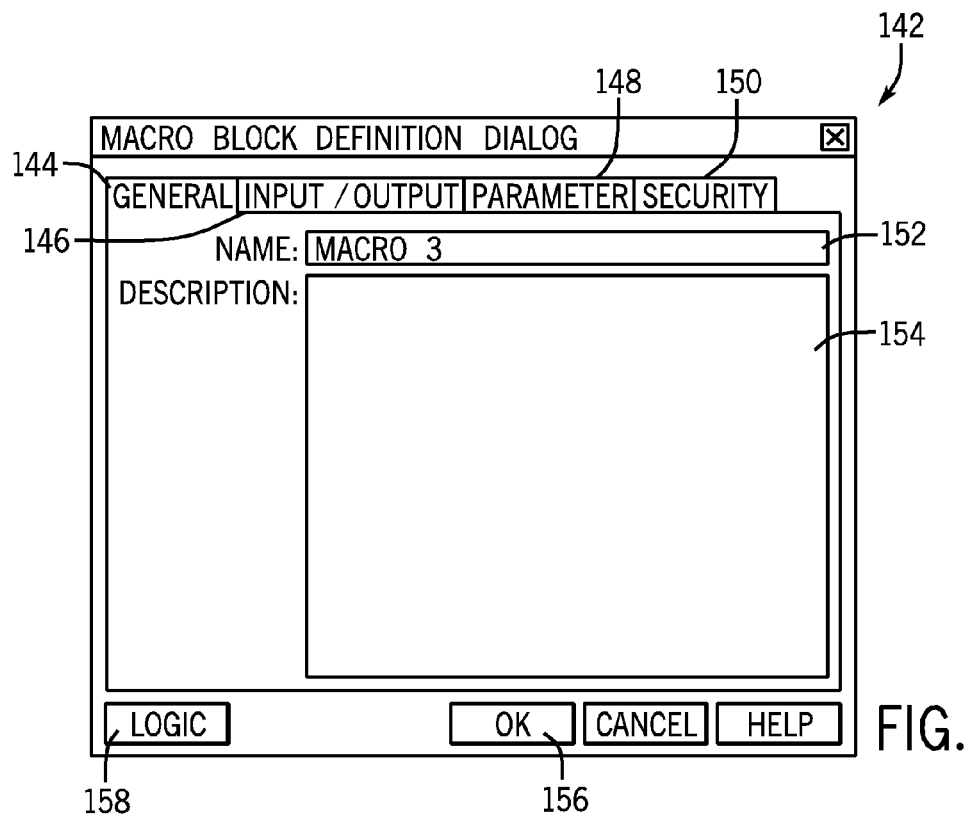
FIG. 15 is an exemplary Macro Block Definition dialog that pops up when the designer selects a Create Macro Block sub-menu item.

In addition, when the designer 62 selects the Create Macro Block sub-menu item 134, a Macro Block Definition dialog pops up. FIG. 15 is an exemplary Macro Block Definition dialog 142 that pops up when the designer 62 selects the Create Macro Block sub-menu item 134. The Macro Block Definition dialog 142 is used to enter and show the generation information about a specific Macro function block 76. The Macro Block Definition dialog 142 may include four tabs: a General tab 144, an Input/Output tab 146, a Parameter tab 148, and a Security tab 150. On the General tab 144 (illustrated in FIG. 15), there is a Name field 152 and a Description field 154. The designer 62 is required to input a unique name for the Macro function block 76. When the designer 62 presses the illustrated OK button 156 or Logic button 158, the name will be checked to see if it is unique. If it is not, the designer 62 is prompted to input another name.

Figure 16:
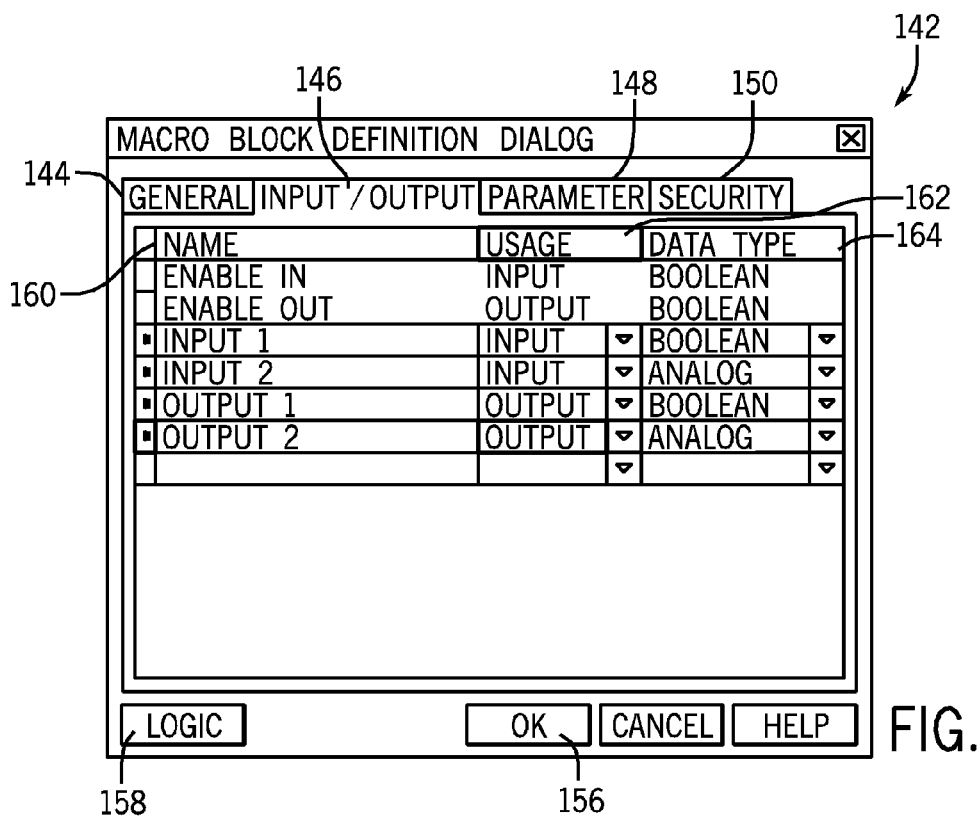
FIG. 16 is the exemplary Macro Block Definition dialog of FIG. 15 when an Input/Output tab is selected.

FIG. 16 is the exemplary Macro Block Definition dialog 142 of FIG. 15 when the Input/Output tab 146 is selected. The Input/Output tab 146 of FIG. 16 shows the Enable In macro function block input and the Enable Out macro function block output as grayed out and read-only. The designer 62 may define the input/output ports of the Macro function block 76 in the Input/Output tab 146. In particular, the designer 62 may input the intended name for the target port in the Name column 160, Input or Output may be selected in the Usage column 162, and the data type may be selected in the Data Type column 164. There are only two data types that may be selected, BOOLEAN and ANALOG. The data type BOOLEAN indicates that the defined Input/Output can only be bound with Boolean data, whereas the type ANALOG represents a wide class of basic data types. Any basic data type other than Boolean may be viewed as the ANALOG type.

Figure 17:
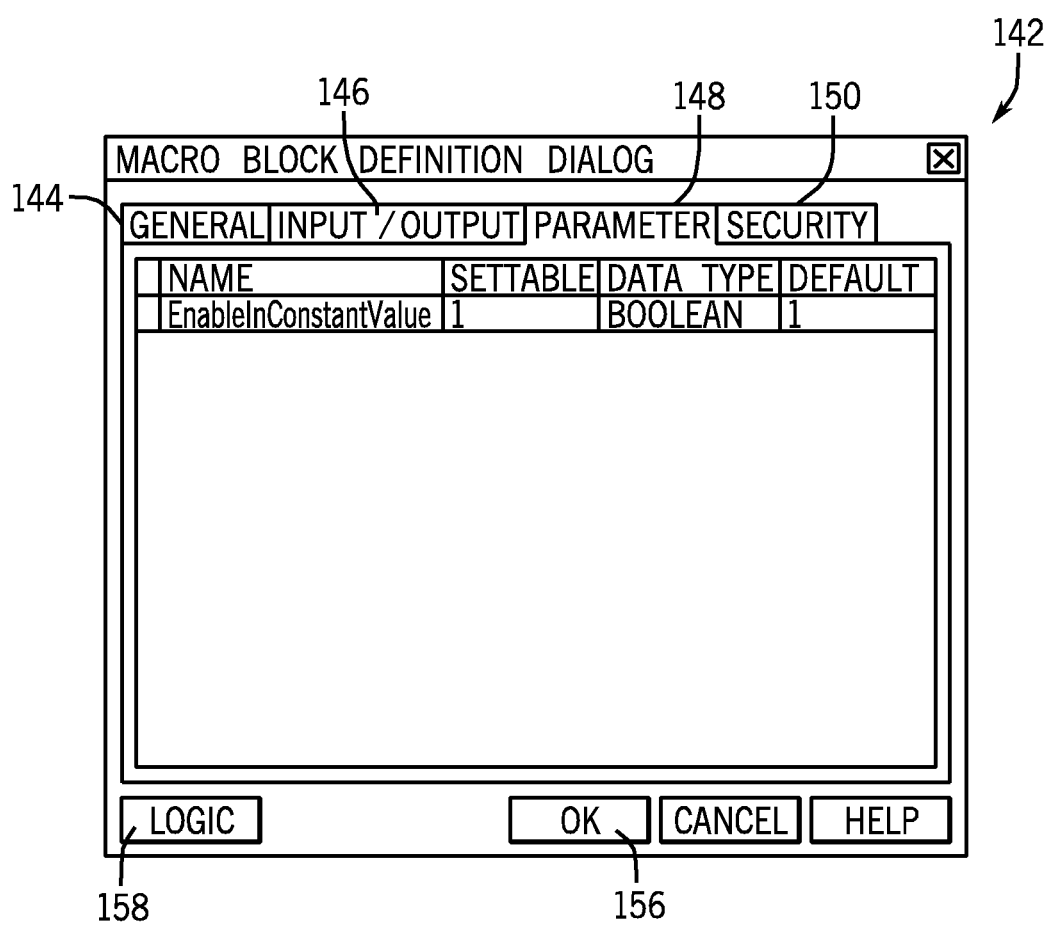
FIG. 17 is the exemplary Macro Block Definition dialog of FIG. 15 when a Parameter tab is selected.
Figure 18:
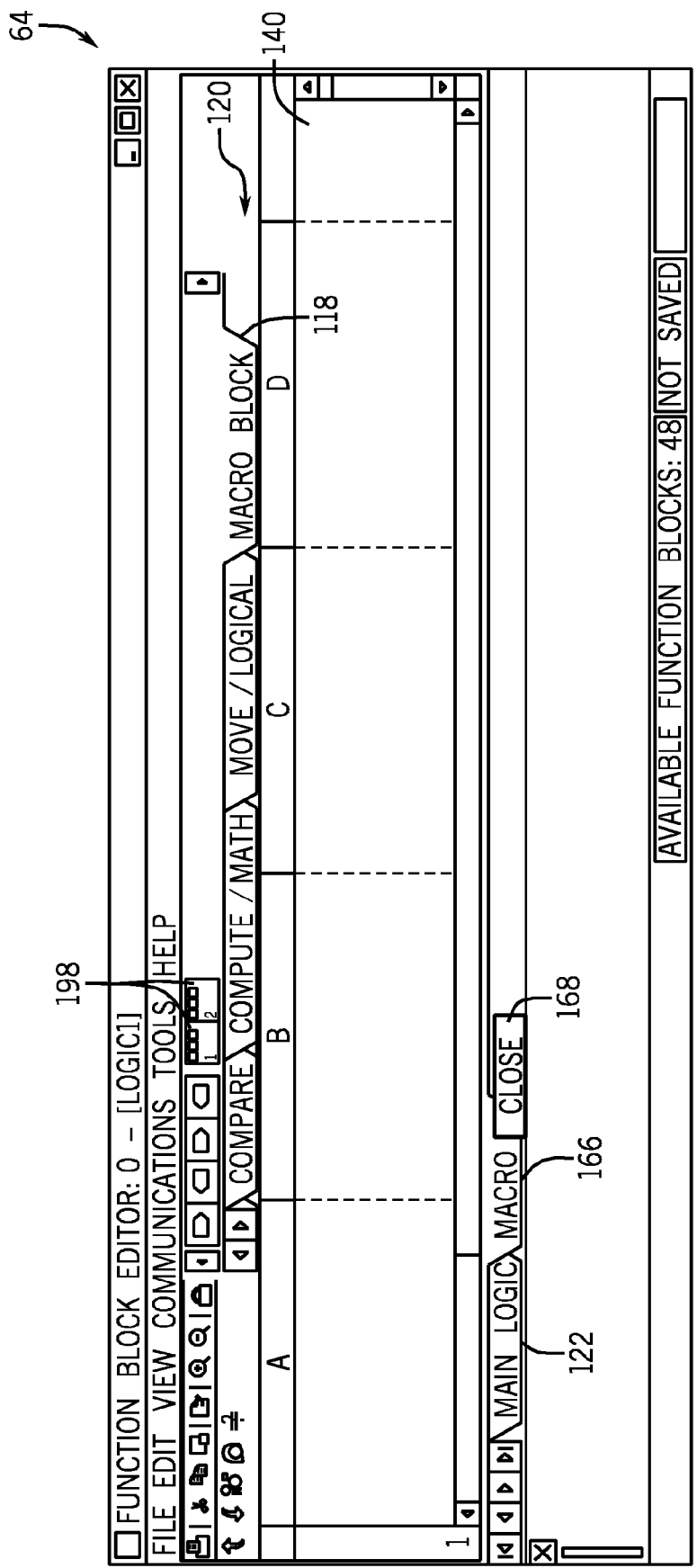
FIG. 18 is a partial screenshot of the browser illustrating a Close menu item being selected.

FIG. 17 is the exemplary Macro Block Definition dialog 142 of FIG. 15 when the Parameter tab 148 is selected. By default, there are no parameters available in the Parameter tab 148, or only the Enable input constant value parameter if the enable line is supported. When the designer 62 presses the OK button 156, the modifications made by the designer 62 in the Macro Block Definition dialog 142 will be applied. In addition, when the designer 62 presses the OK button 156, the tabbed Macro function block editing window 140 of FIG. 14 is created and the Macro function block 76 is added to the Macro Block tab 118 of the Instruction Toolbar 120. After the designer 62 edits the logic to define the Macro function block 76 in the Macro function block editing window 140, the designer 62 may move the mouse on a Macro function block tab 166 and right-click on the mouse to choose a Close menu item 168 to close the selected tabbed Macro function block editing window 140. FIG. 18 is a partial screenshot of the browser 64 illustrating the Close menu item 168 being selected.

Use Case: Configure Macro Function Block Logic

Figure 19:
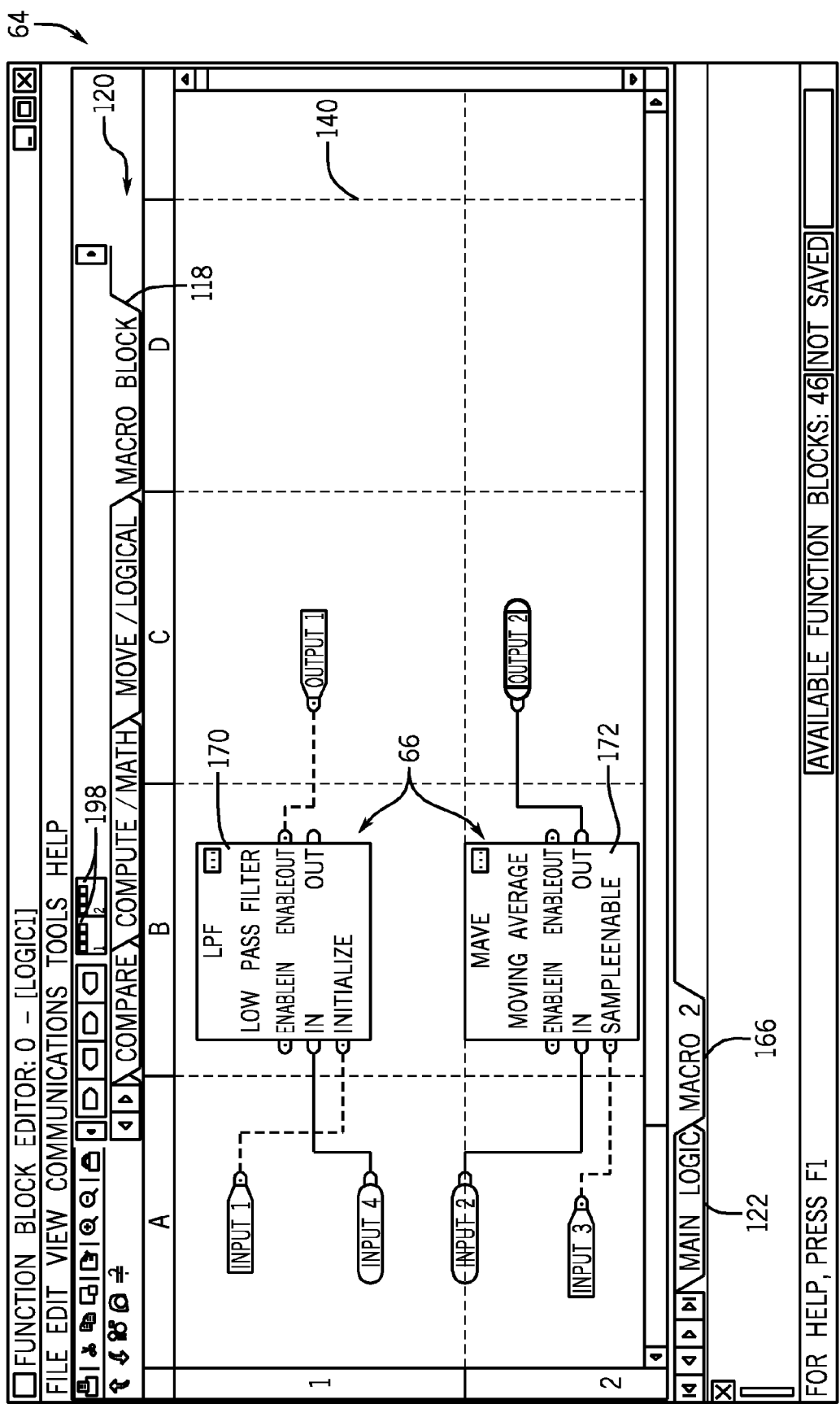
FIG. 19 is a screenshot of the browser illustrating two function blocks having been dragged from function block instructions of an Instruction Toolbar.
Figure 20:
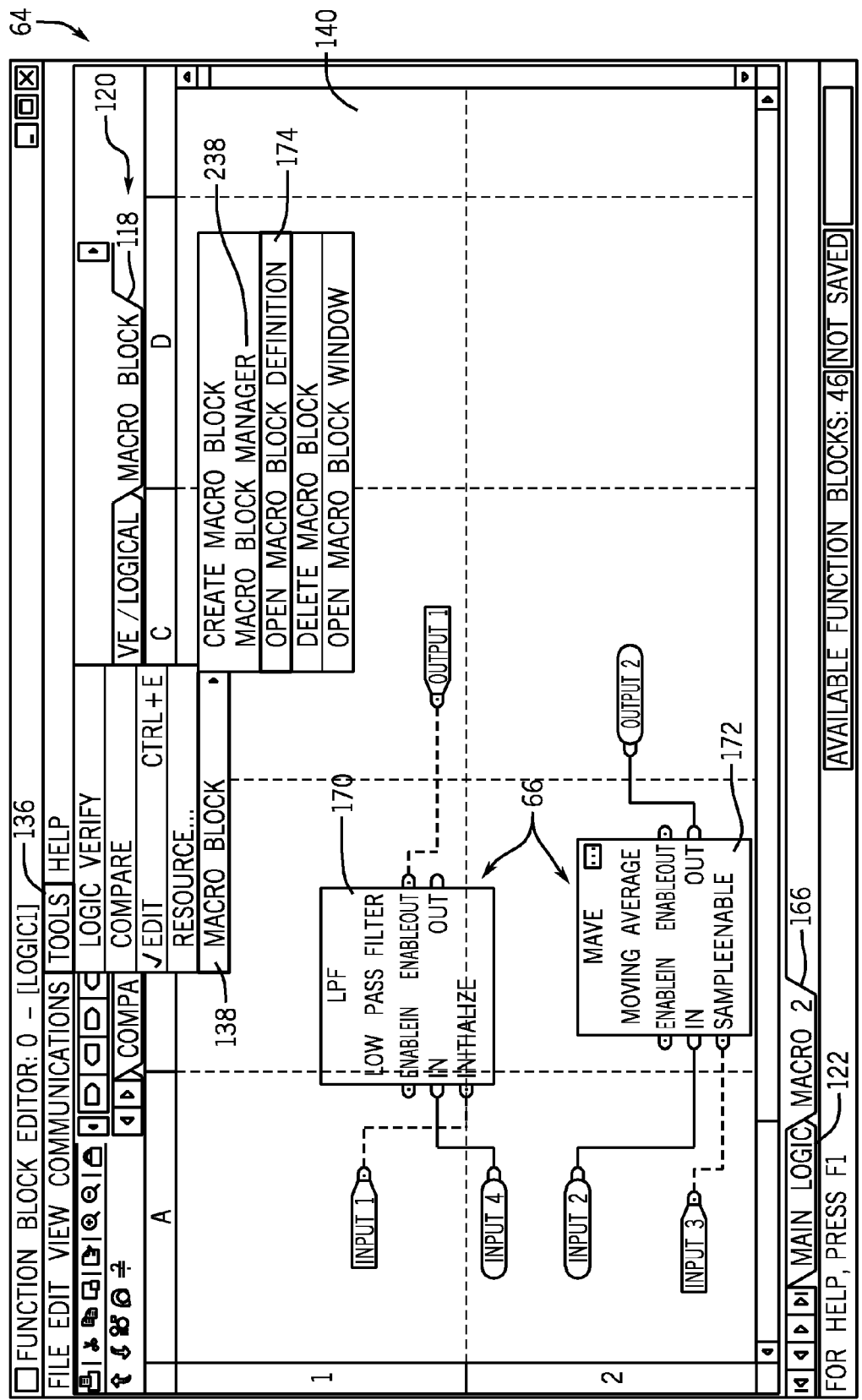
FIG. 20 is a screenshot of the browser illustrating the designer clicking an Open Macro Block Definition sub-menu item from the main Tools menu and the Macro Block sub-menu under the main Tools menu.
Figure 21:
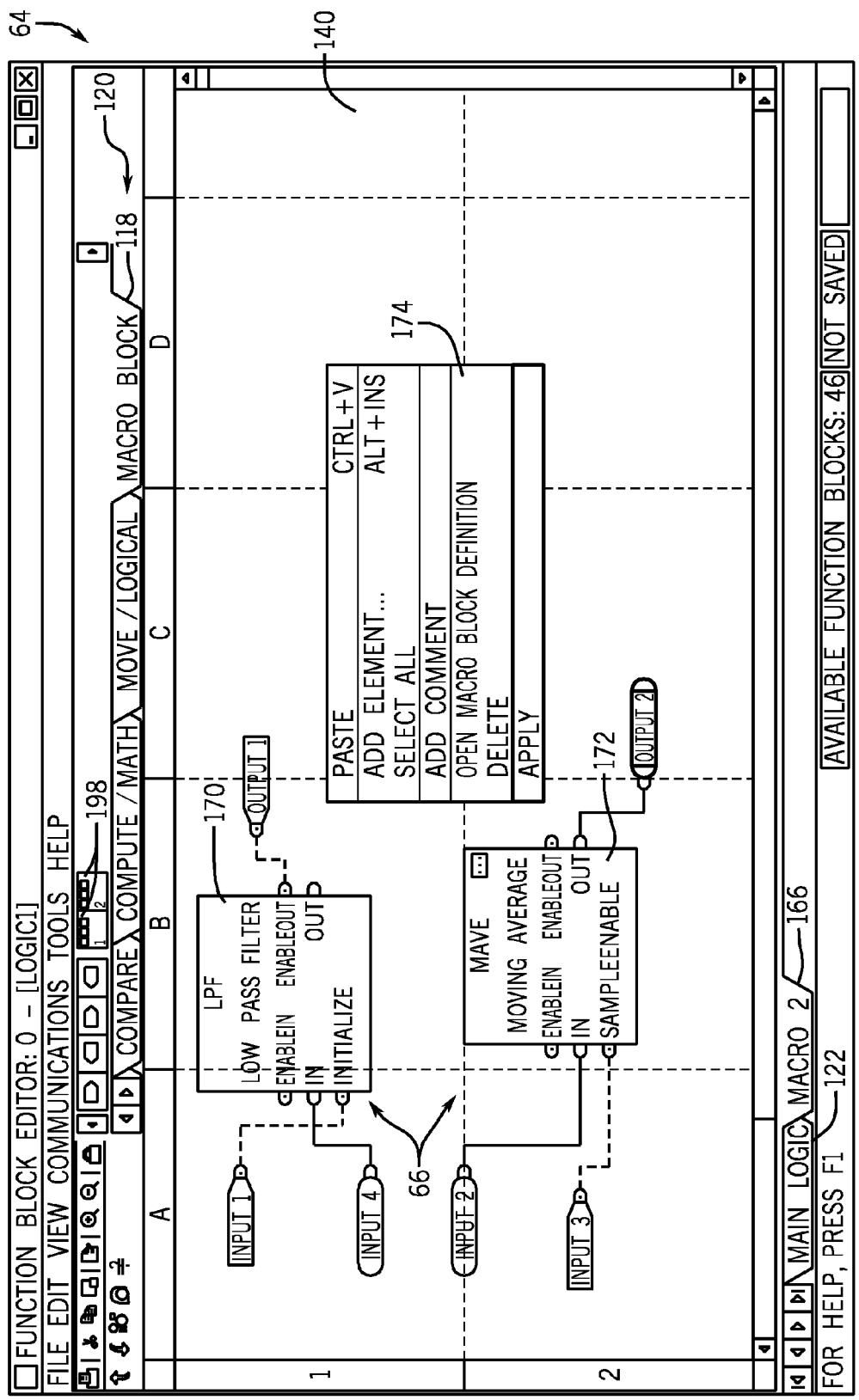
FIG. 21 is a screenshot of the browser illustrating the designer right-clicking a mouse on a Macro function block editing window.

The designer 62 may use the browser 64 in Editing mode to edit an active Macro function block 76. In particular, FIG. 19 is a screenshot of the browser 64 illustrating two function blocks 66 having been dragged from function block instructions of the Instruction Toolbar 120. The designer 62 is using the two illustrated function blocks 66 (e.g., the LPF (low-pass filter) function block 170 and the MAVE (moving average) function block 172) to build up the definition of the Macro function block 76 exactly the same as configuration is done in the main logic. The designer 62 may launch the Macro Block Definition dialog 142 of FIGS. 15 through 17 in one of two ways. For example, FIG. 20 is a screenshot of the browser 64 illustrating the designer 62 clicking the Open Macro Block Definition sub-menu item 174 from the main Tools menu 136 and the Macro Block sub-menu 138 under the main Tools menu 136. Another way is to right-click the mouse on the Macro function block editing window 140. FIG. 21 is a screenshot of the browser 64 illustrating the designer 62 right-clicking the mouse on the Macro function block editing window 140. As illustrated in FIG. 21, the Open Macro Block Definition sub-menu item 174 becomes available.

Figure 22:
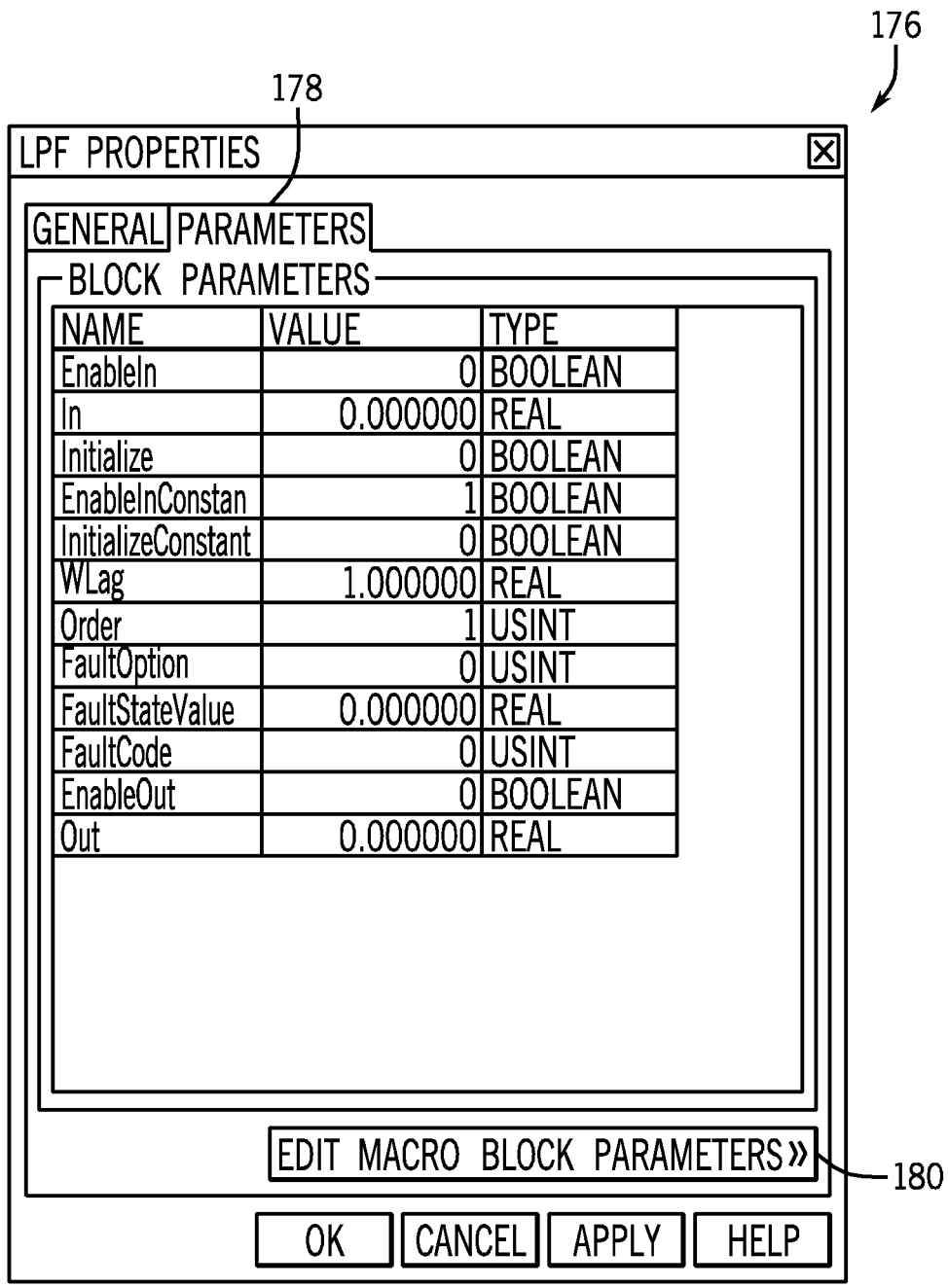
FIG. 22 is an exemplary function block property dialog that pops up when the designer clicks on a target function block.

From the Macro function block editing window 140, opening a Property dialog for an individual function block 66 of the Macro function block 76 enables the designer 62 to edit the properties of the Macro function block 76 that may be accessible outside without opening up the Macro Block Definition dialog 142. By clicking on the target function block 66, a function block property dialog may be launched. FIG. 22 is an exemplary function block property dialog 176 that pops up when the designer 62 clicks on a target function block 66. As illustrated, a Parameters tab 178 may be selected to view the parameters of the target function block 66 (e.g., the LPF function block 170 of FIGS. 19-21).

Figure 23:
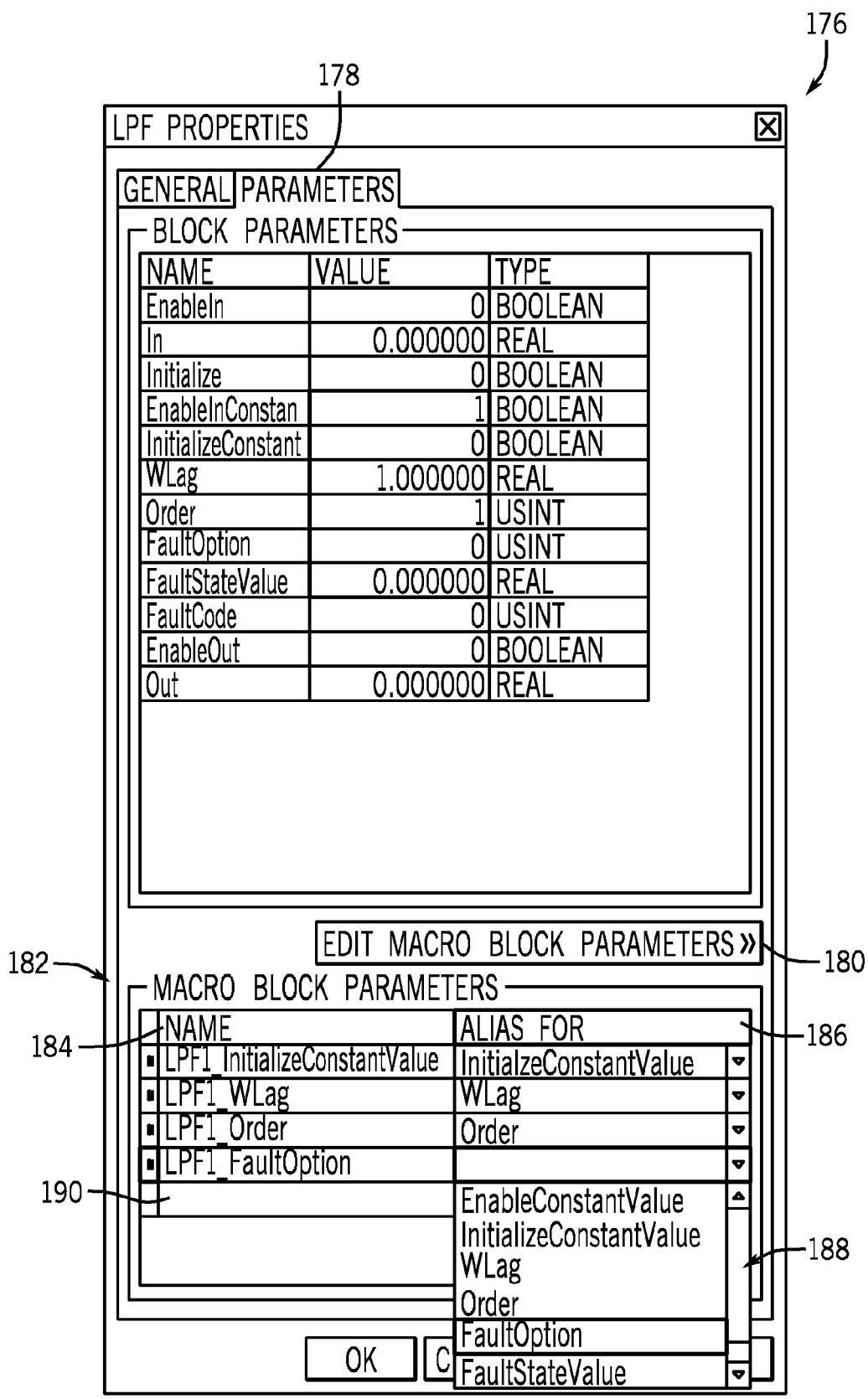
FIG. 23 is the exemplary function block property dialog of FIG. 22 when an Edit Macro Block Parameter button has been pressed and a list of externally viewable Macro function block parameters are displayed.

An Edit Macro Block Parameter button 180 may be pressed to display a list of externally viewable Macro function block parameters. FIG. 23 is the exemplary function block property dialog 176 of FIG. 22 when the Edit Macro Block Parameter button 180 has been pressed and the list 182 of externally viewable Macro function block parameters are displayed. A name column 184 is the name of the Macro function block parameter, which cannot be empty and must be unique. An Alias For column 186 is the alias of the Macro function block parameter. When the designer 62 clicks any cell in the Alias For column 186, a combo window 188 is displayed listing all of the available parameters in the specific function block 66. The designer 62 may choose which function block parameter is referenced by the Macro function block parameter. When a function block parameter has been referenced, that function block parameter will no longer be viewable in the combo window 188.

There will always be one empty row 190 displayed in the list 182 of externally viewable Macro function block parameters. Every time the designer 62 inputs a Name or chooses a function block attribute in the Alias For cell, a new Macro function block parameter is created and another new empty row 190 is displayed. The designer 62 may also delete macro function block parameters from the list 182 of externally viewable Macro function block parameters. In addition, the designer 62 may launch the Macro Block Definition dialog 142 of FIGS. 15 through 17 by double-clicking on the list 182 of externally viewable Macro function block parameters.

Returning now to FIG. 21, when the designer 62 is finished modifying the Macro function block logic, the designer 62 may right-click the mouse on the Macro function block editing window 140 and select the Apply menu item to apply the modifications. If the logic in the Macro function block passes verification, its corresponding button on the Macro Block tab 118 of the Instruction Toolbar 120 is enabled. Copying and pasting between the main logic screen and the Macro function block editing window 140 is supported. When the Macro function block logic is being configured, all of the Macro function block instructions in the Instruction Toolbar 120 may be grayed out.

Use Case: Macro Function Block in the Main Logic

Figure 24:
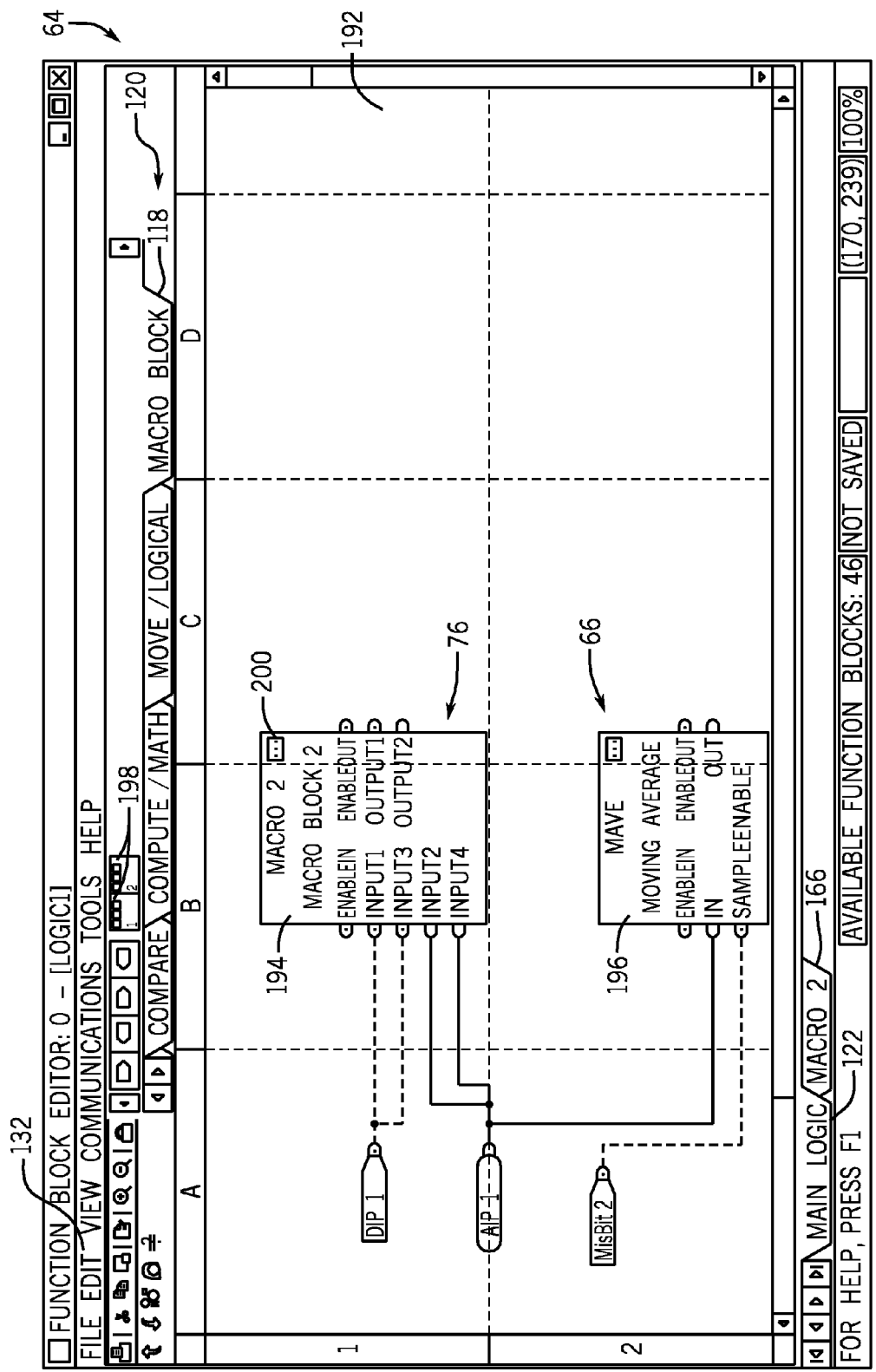
FIG. 24 is a screenshot of the browser illustrating a Macro function block being used with a component function block in a main logic window of the browser.

The designer 62 may use the browser 64 to add a Macro function block 76 to the main logic. FIG. 24 is a screenshot of the browser 64 illustrating a Macro function block 76 being used with a component function block 66 in a main logic window 192 of the browser 64. In particular, the designer 62 is using the "Macro 2" macro function block 194 with a MAVE (moving average) component function block 196. The designer 62 may create instances of Macro function blocks 76 in the main logic window 192 in various ways. For example, as described above, the designer 62 may select the Add Element sub-menu item 126 from the main Edit menu 132. In addition, a button 198 in the Macro Block tab 118 of the Instruction Toolbar 120 may be clicked or dragged and dropped into the main logic window 192. Each Macro function block instance is added to the main logic window 192 without external connections. The external visibility of the Macro function block instance follows the convention: the digital input and output for the Macro function block instance will be graphically presented as ▭ and ▭, respectively, and the analog input and output for the Macro function block instance will be graphically presented as ▭ and ▭, respectively.

Use Case: Configure Macro Function Block Instance Parameters

Figure 25:
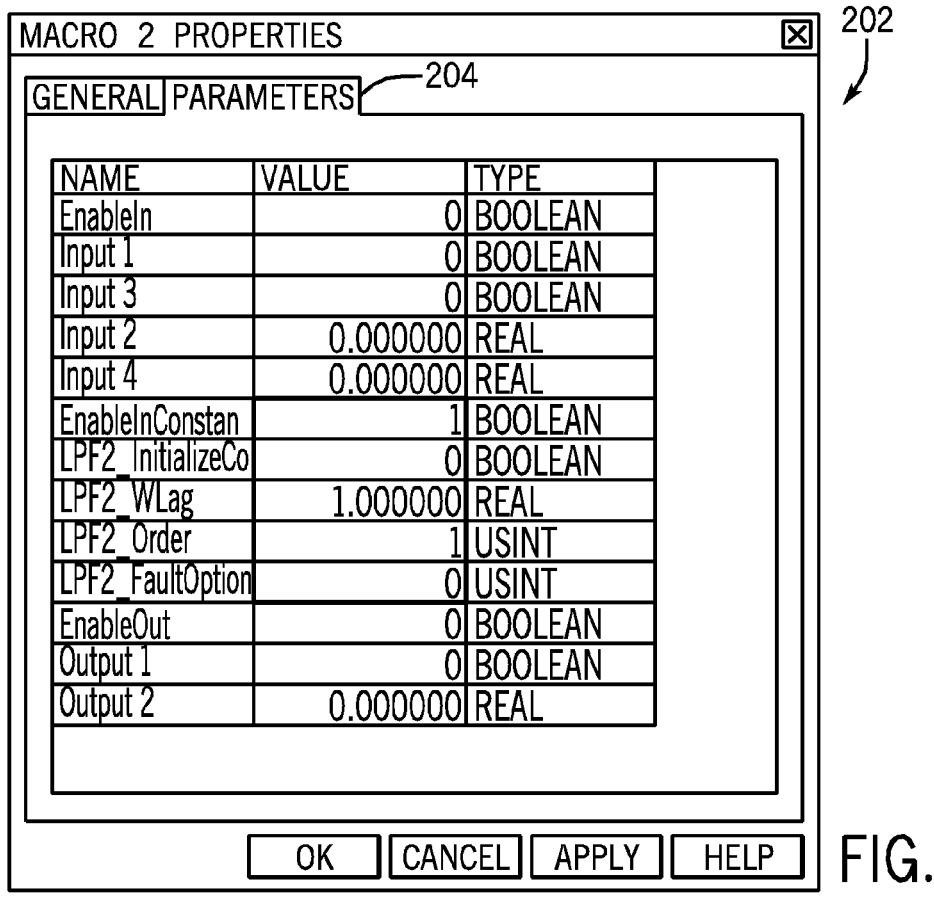
FIG. 25 is an exemplary Macro function block property dialog that pops up when the designer clicks on a button in a top-right corner of a Macro function block instance.

Once the Macro function block instance (e.g., the Macro 2 block 194 of FIG. 24) has been added to the main logic window 192, the designer 62 may configure the parameters of the Macro function block instance. The designer 62 may click the button 200 in the top-right corner of the Macro function block instance. FIG. 25 is an exemplary Macro function block property dialog 202 that pops up when the designer 62 clicks on the button 200 in the top-right corner of the Macro function block instance. As illustrated, a Parameters tab 204 may be selected to view the external parameters of the Macro function block instance (e.g., the Macro 2 block 194 of FIG. 24) and modify the external parameters if they are settable. If the Macro function block 76 is security-enabled, the designer 62 is prompted to input a password before entering the Macro function block editing window 140. In the Macro function block editing window 140, the Macro function block logic configuration and layout for editing the component parameters are exactly the same as when the Macro function block 76 is defined.

Use Case: Manage Macro Function Block

Figure 26:
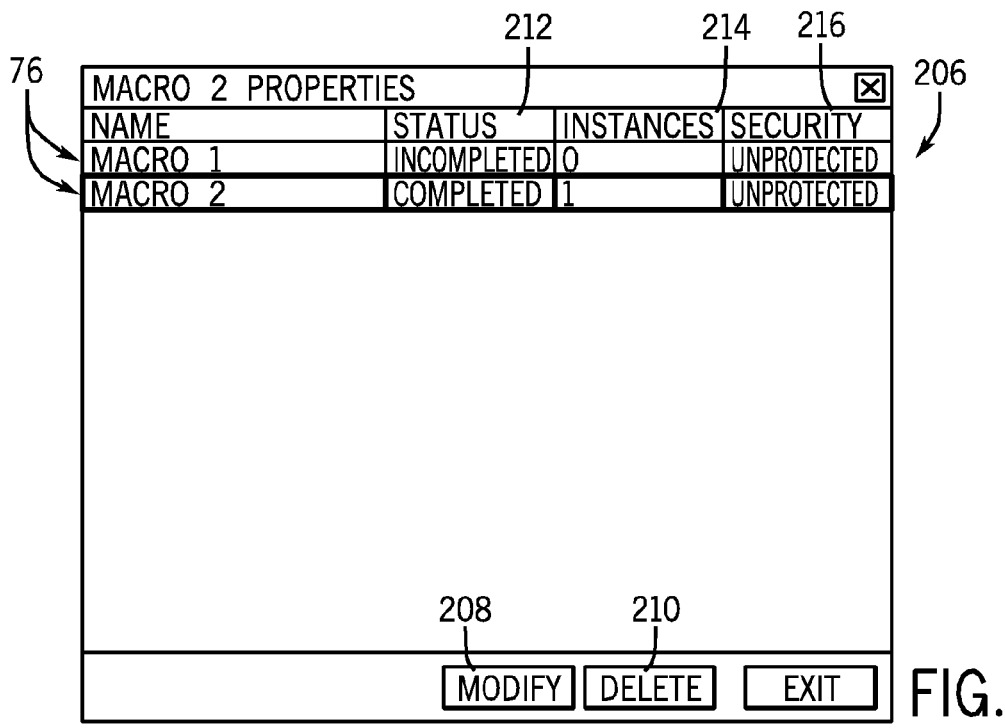
FIG. 26 is an exemplary Macro Block Manager dialog that pops up when the designer selects a particular Macro function block instance in the Macro function block editing window and selects a Macro Block Manager option.

The designer 62 may use the browser 64 to manage Macro function blocks 76. FIG. 26 is an exemplary Macro Block Manager dialog 206 that pops up when the designer 62 selects a particular Macro function block instance in the Macro function block editing window 140 and selects a Macro Block Manager option. In particular, the designer 62 may choose the Macro Block Manager option with a Macro function block instance selected by clicking a Macro Block Manager sub-menu item from the main Tools menu 136 and the Macro Block sub-menu 138 under the main Tools menu 136 of the browser 64 (see, e.g., FIG. 20). The Macro Block Manager dialog 206 lists all Macro function blocks 76, regardless of their completion status. Individual Macro function blocks 76 may be selected and either modified by pressing a Modify button 208 or deleted by pressing a Delete button 210. If the browser 64 is not in Editing mode, the Modify button 208 and the Delete button 210 are disabled. Conversely, if the browser 64 is in Editing mode, the Modify button 208 and the Delete button 210 are enabled. A Status column 212 shows whether the particular Macro function block 76 has been completed. An Instances column 214 shows how many Macro function block instances have been created. This information gives a summary about the Macro function block instances being used when the designer 62 intends to modify or delete the defined Macro function block 76. A Security column 216 shows whether the particular Macro function block 76 is under password protection.

Use Case: Modify Macro Function Block Definition

Figure 27:
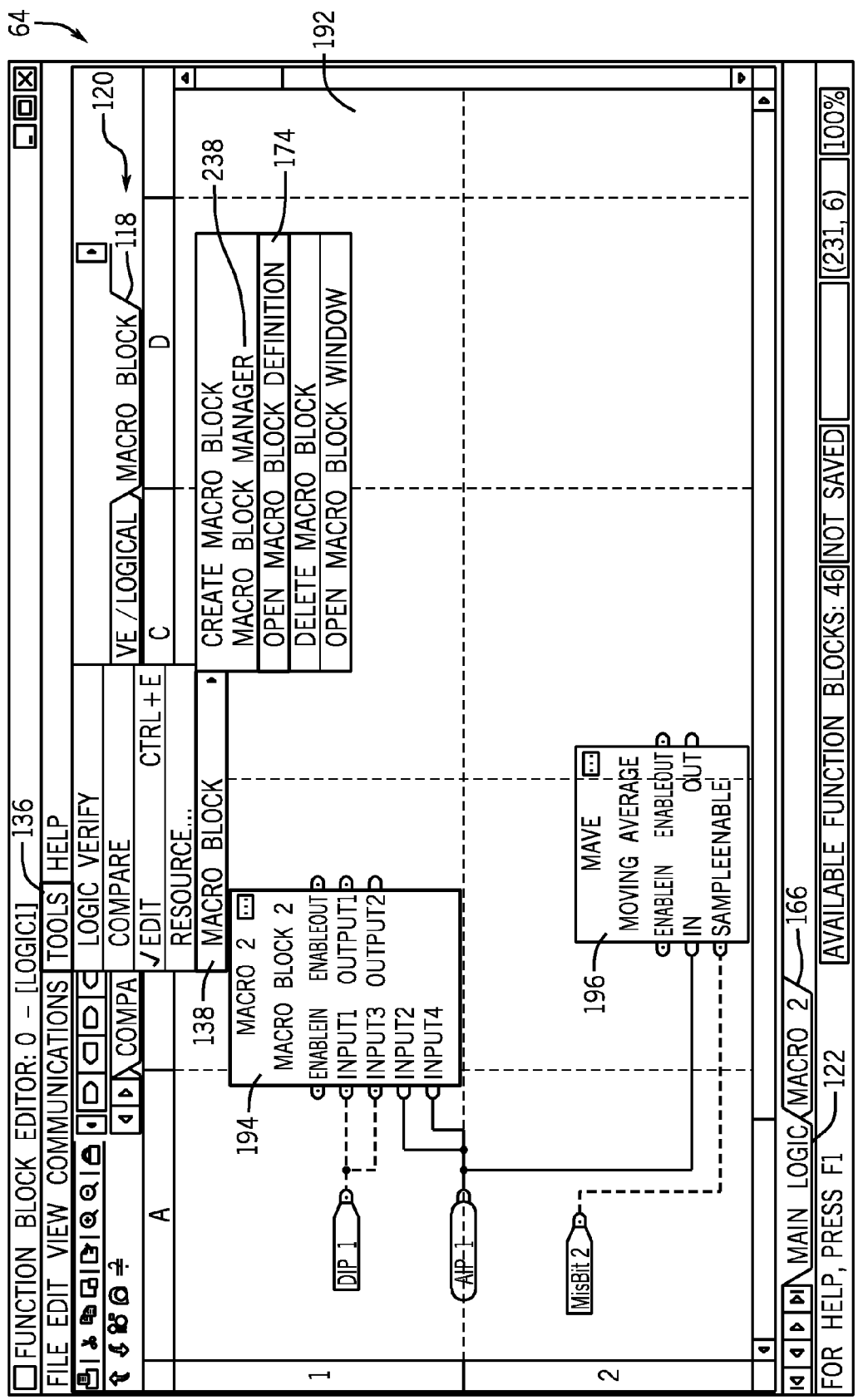
FIG. 27 is a screenshot of the browser illustrating the designer clicking the Open Macro Block Definition sub-menu item from the main Tools menu and the Macro Block sub-menu under the main Tools menu.
Figure 28:
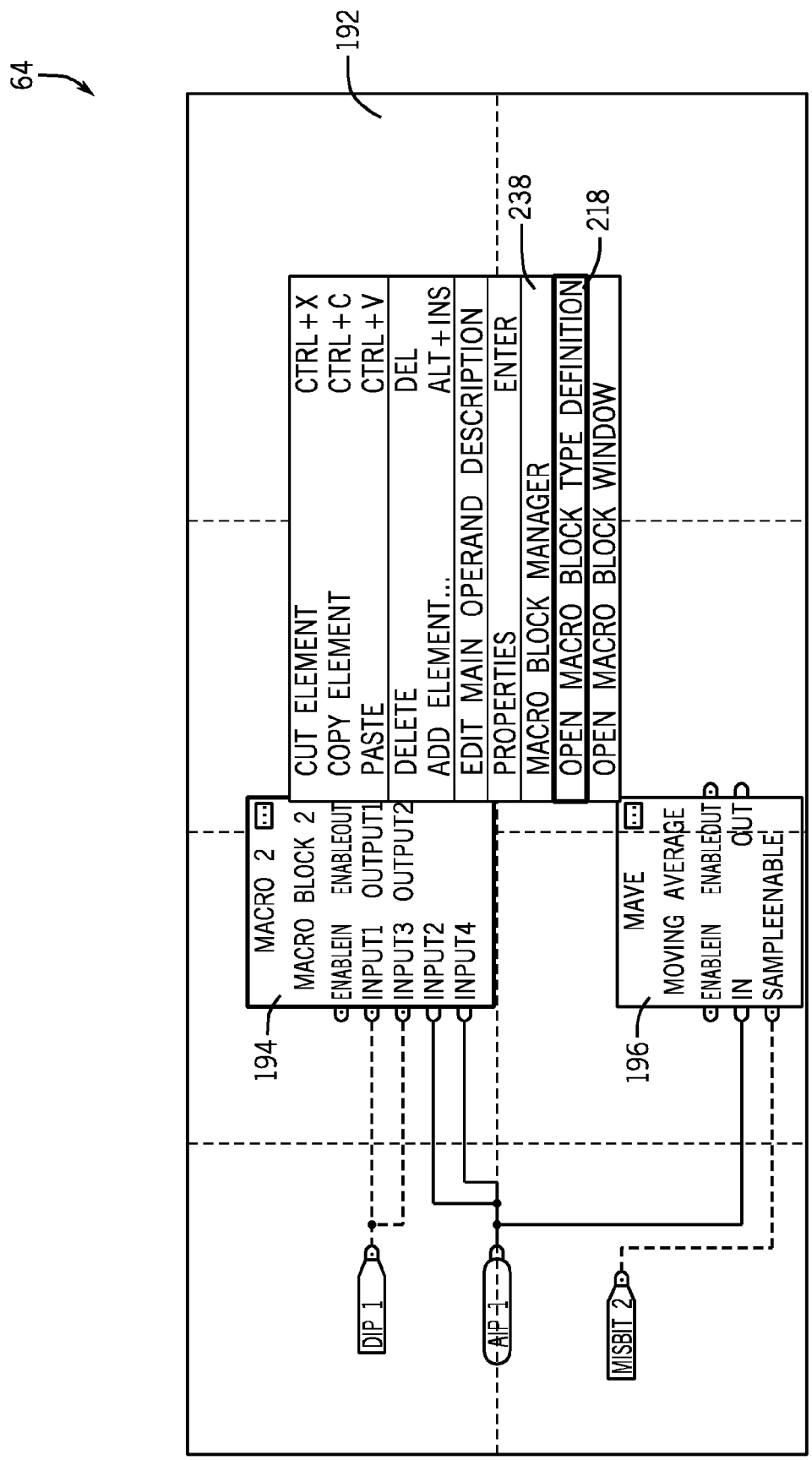
FIG. 28 is a partial screenshot of the browser illustrating the designer right-clicking the mouse on a Macro function block instance.

As described above, the designer 62 may use the browser 64 in Editing mode to modify an active Macro function block 76. Returning to the example illustrated in FIG. 24, the designer 62 may launch the Macro Block Definition dialog 142 of FIGS. 15 through 17 in many various ways. For example, FIG. 27 is a screenshot of the browser 64 illustrating the designer 62 clicking the Open Macro Block Definition sub-menu item 174 from the main Tools menu 136 and the Macro Block sub-menu 138 under the main Tools menu 136. Another way is to right-click the mouse on a Macro function block instance. FIG. 28 is a partial screenshot of the browser 64 illustrating the designer 62 right-clicking the mouse on a Macro function block instance. As illustrated in FIG. 28, the Open Macro Block Type Definition sub-menu item 218 becomes available. Alternatively, the designer 62 may press the Modify button 208 of the Macro Block Manager dialog 206 of FIG. 26. Any one of these options brings up the Macro Block Definition dialog 142 of FIGS. 15 through 17.

Figure 29:
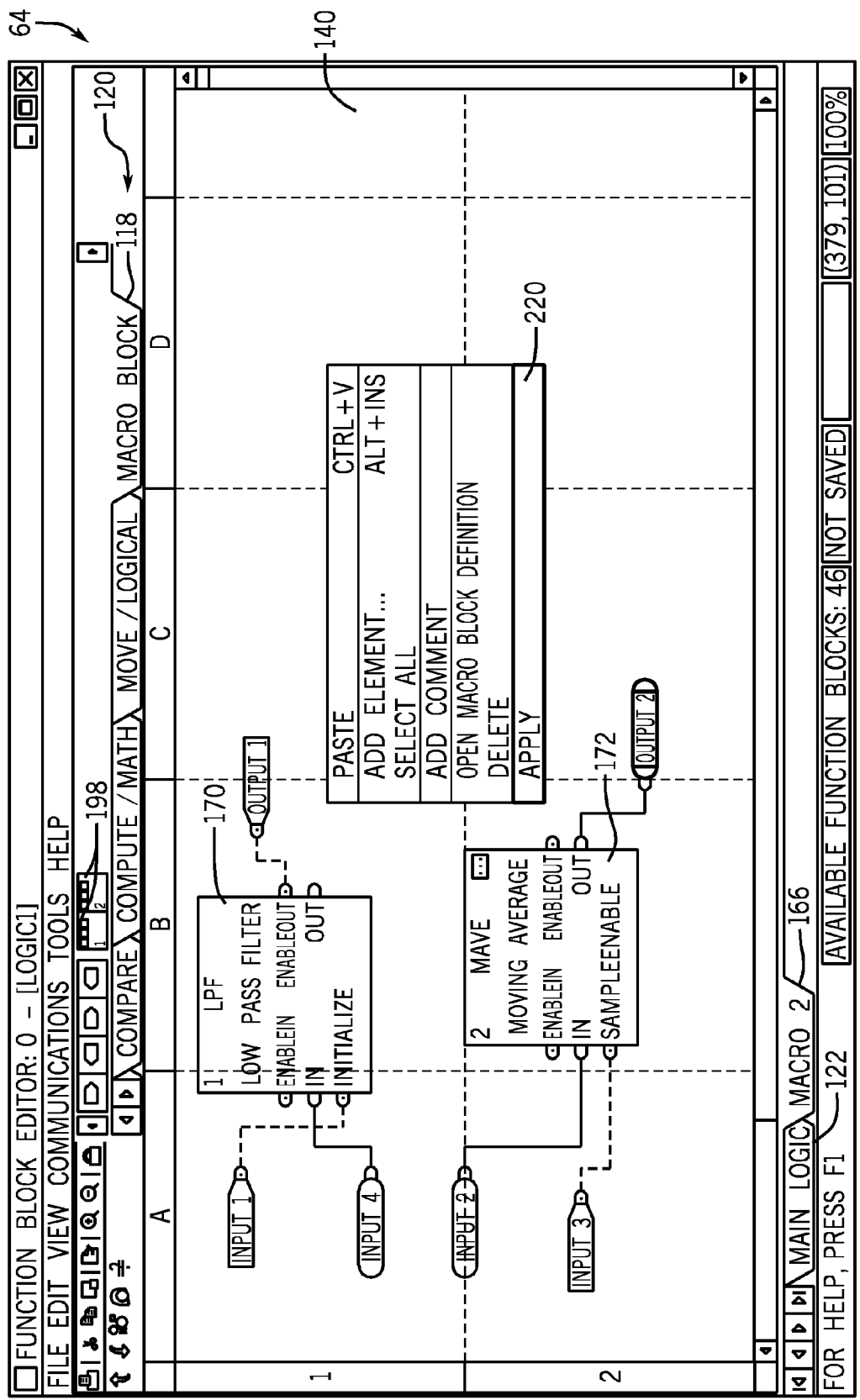
FIG. 29 is a screenshot of the browser illustrating the designer applying all of the edits by clicking on an Apply menu item.

Once the Macro Block Definition dialog 142 of FIGS. 15 through 17 is displayed, the designer 62 may modify the name of a selected Macro function block 76 in the Name field 152 on the General tab 144 illustrated in FIG. 15. When the designer 62 presses the OK button 156, the name will be applied to all instances of the selected Macro function block 76, and the Macro function block button 198 on the Macro Block tab 118 of the Instruction Toolbar 120 will be updated with the new name. The designer 62 may modify the inputs and outputs of the selected Macro function block 76 on the Input/Output tab 146 illustrated in FIG. 16. When the designer 62 presses the OK button 156, the inputs and outputs of all of the instances of the Macro function block 76 will be updated. The designer 62 may enable the security of set a new password on the Security tab 150. If the designer 62 presses the OK button 156, the security modification will apply to all instances of the selected Macro function block 76. The modification of the logic of the selected Macro function block 76 includes the parameter configuration for each component function block 66. After modification of the selected Macro function block 76, the designer 62 may click an Apply menu option to apply all of the edits. FIG. 29 is a screenshot of the browser 64 illustrating the designer 62 applying all of the edits by clicking on an Apply menu item 220.

Use Case: Remove a Macro Function Block Definition

The designer 62 may also use the browser 64 in Editing mode to remove an active Macro function block 76. Returning to the example illustrated in FIGS. 27 and 28, the designer 62 may choose the Macro Block Manager option with a Macro function block instance selected by clicking a Macro Block Manager sub-menu item 238 from the main Tools menu 136 and the Macro Block sub-menu 138 under the main Tools menu 136 of the browser 64 (see, e.g., FIG. 20). Doing so brings up the Macro Block Manager dialog 206 of FIG. 26, in which the designer 62 may select a Macro function block 76 and press the Delete button 210 to remove the selected Macro function block 76. If the deleted Macro function block 76 has been used in the main logic, the designer 62 will be prompted and must choose to continue to delete the selected Macro function block 76. If the designer 62 chooses Yes, the selected Macro function block 76 will disappear from the instruction list of the Macro Block tab 118 of the Instruction Toolbar 120. In the main logic, the used instances with the type of the removed Macro function block 76 will be deleted.

The Macro function block 76 encapsulates the customized control logic for the particular application, which contains the Intellectual Property (IP) that designers 62 might not want to expose to other people. Password protection aims to provide the capability for the Macro function block designers 62 to protect their IP. The password is set at the stage of the Macro function block 76 being designed. Its scope will extend to each Macro function block instance when it is applied in the main logic.

Use Case: Set the Password Protection

Figure 30:
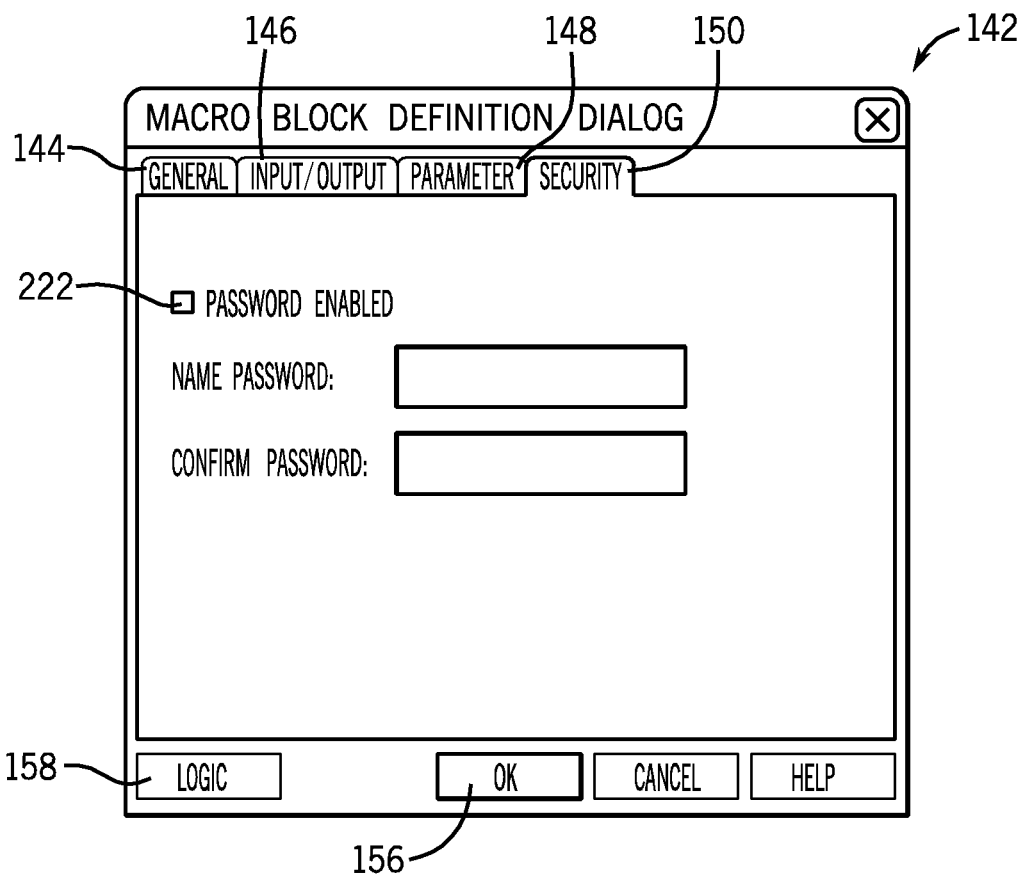
FIG. 30 is the exemplary Macro Block Definition dialog of FIG. 15 when a Security tab is selected.

The designer 62 may also use the browser 64 in Editing mode to set the password protection of an active Macro function block 76. Returning to the example illustrated in FIGS. 27 and 28, the designer 62 may open the Macro Block Definition dialog 142 of FIGS. 15 through 17 in any of the ways described above. Once the Macro Block Definition dialog 142 has been opened, the designer 62 may select the Security tab 150. FIG. 30 is the exemplary Macro Block Definition dialog 142 of FIG. 15 when the Security tab 150 is selected. By default, password protection is disabled. The designer 62 may select the Password Enabled check box 222 to enable password protection for the Macro function block 76. Once the Password Enabled check box 220 is checked, the designer 62 may establish a new password.

Use Case: Operate the Macro Function Block under the Password Protection

Figure 31:
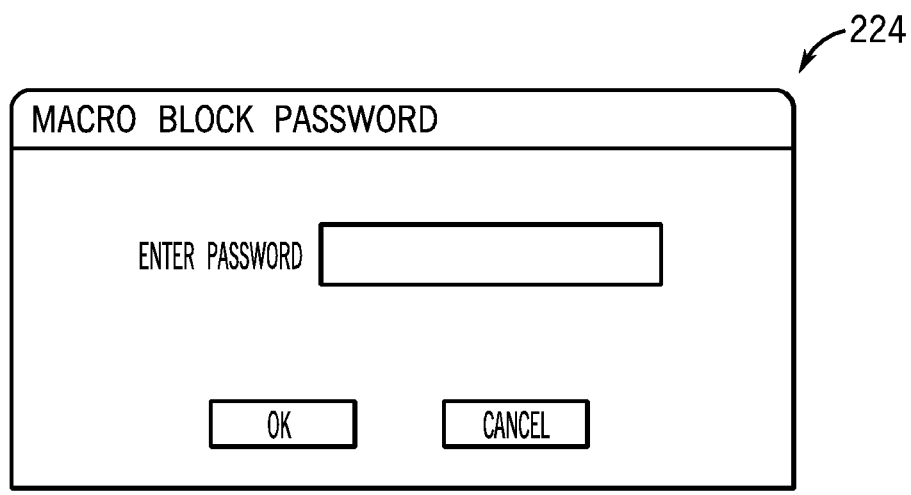
FIG. 31 is an exemplary Macro Block Password dialog that is displayed when the designer attempts to use a password-protected Macro function block.

Once password protection has been set up for a particular Macro function block 76, use of the password-protected Macro function block 76 will require the designer 62 to verify the password. For example, FIG. 31 is an exemplary Macro Block Password dialog 224 that is displayed when the designer 62 attempts to use a password-protected Macro function block 76. When the configuration software 50 is interacting online with the automation device 18, the entered password will be sent to the automation device 18. If the automation device 18 passes the password validation, the configuration software 50 will continue the operation as described in previous use cases. When the configuration software 50 is offline and not interacting online with the automation device 18, the configuration software 50 takes responsibility for verifying the password. If it passes the validation, the configuration software 50 will continue the operation as described in previous use cases.

The configuration software 50 has three distinct operating modes. The first operating mode is an Online Animation mode. In this mode, the configuration software 50 continuously communicates with the target automation device 18. The configuration software 50 will operate in this mode when the configuration software 50 is in an online state, and when the configuration matches the configuration present on the automation device 18. The designer 62 will see the results of the execution of the logic on the automated device 18 in an animated fashion. The designer 62 will only be allowed to make attribute modifications to the logic while in this mode. However, if the designer 62 chooses to edit the configuration, the configuration software 50 will exit this mode and enter the Editing mode, described below. The second operating mode is an Online Pending Edit mode. In this mode, the configuration software 50 can communicate with the automation device 18. The configuration software 50 will operate in this mode when the configuration software 50 is in an online state, and when the configuration does not match the configuration present on the automation device 18. The third operating mode is an Editing mode. In this mode, the designer 62 is allowed to modify the logic, whereas the configuration software 50 can not communicate with the automation device 18.

Use Case: Save and Download the Configuration

The designer 62 may use the configuration software 50 to download the Macro function block definition and its password protection settings to a particular automation device 18. When doing so, the configuration of the automation device 18 is saved to a local file, and the configuration of the automation device 18 is downloaded to the automation device 18. If the configuration software 50 goes to an offline state, the configuration of the automation device 18 may be saved to the local file, including the information of the Macro function block 76 and its password protection settings. When the configuration software 50 is back online, the configuration of the automation device 18 is downloaded to the automation device 18 at that time, including the information of the Macro function block 76 and its password protection settings.

Use Case: Upload and Save the Configuration

The designer 62 may also use the configuration software 50 to upload the Macro function block definition and it password protections settings from a particular automation device 18 if the automation device 18 has already been configured. When doing so, the configuration of the automation device 18 is uploaded from the automation device 18, and saved to a local file. If the configuration software 50 goes to an offline state, the configuration of the automation device 18 may be saved to the local file, including the information of the Macro function block 76 and its password protection settings. If the configuration software 50 is back online, the configuration of the automation device 18 is downloaded to the automation device 18, including the information of the Macro function block 76 and its password protection settings. The saved configuration of the automation device 18 may then be operated on in either online or offline mode.

An Exemplary Macro Function Block—Composite Alarm

The configuration software 50 provides an Alarm function block as basic functional logic. The Alarm function block receives the input signal from the input port, and based on the configuration of the parameters: High-High Limit, High Limit, Low Limit, and Low-Low Limit, to output the alarm signal via one output port. This single output, with the data type of WORD, contains the multiple alarms. There are the least four bits in the output WORD to be defined, in which: Bit 0—LLAlarm, Bit 1—LAlarm, Bit 2—HAlarm, and Bit 3—HHAlarm. Thus, as introduced in the Alarm function block object definition, the output is to be calculated following the operation rules in the table below, in which HHLimit, HLimit, LLimit, and LLLimit refer to the internal threshold parameters of the Alarm function block that need to be configured by designers 62. FIG. 32 is a list 226 of typical conditions and outputs of an exemplary Alarm function block.

Figure 33:
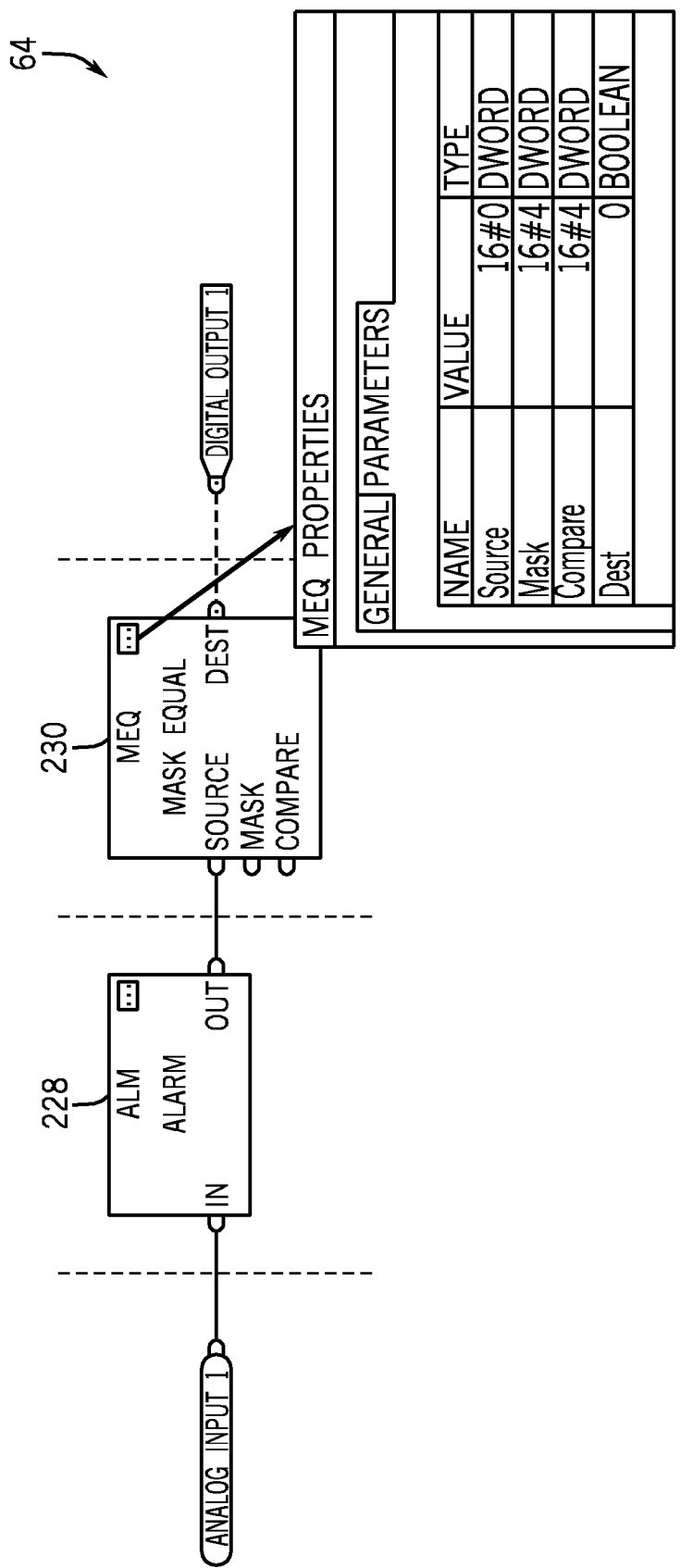
FIG. 33 is a partial screenshot of the browser illustrating an exemplary Alarm function block being used with a Mark Equal (MEQ) function block.
Figure 34:
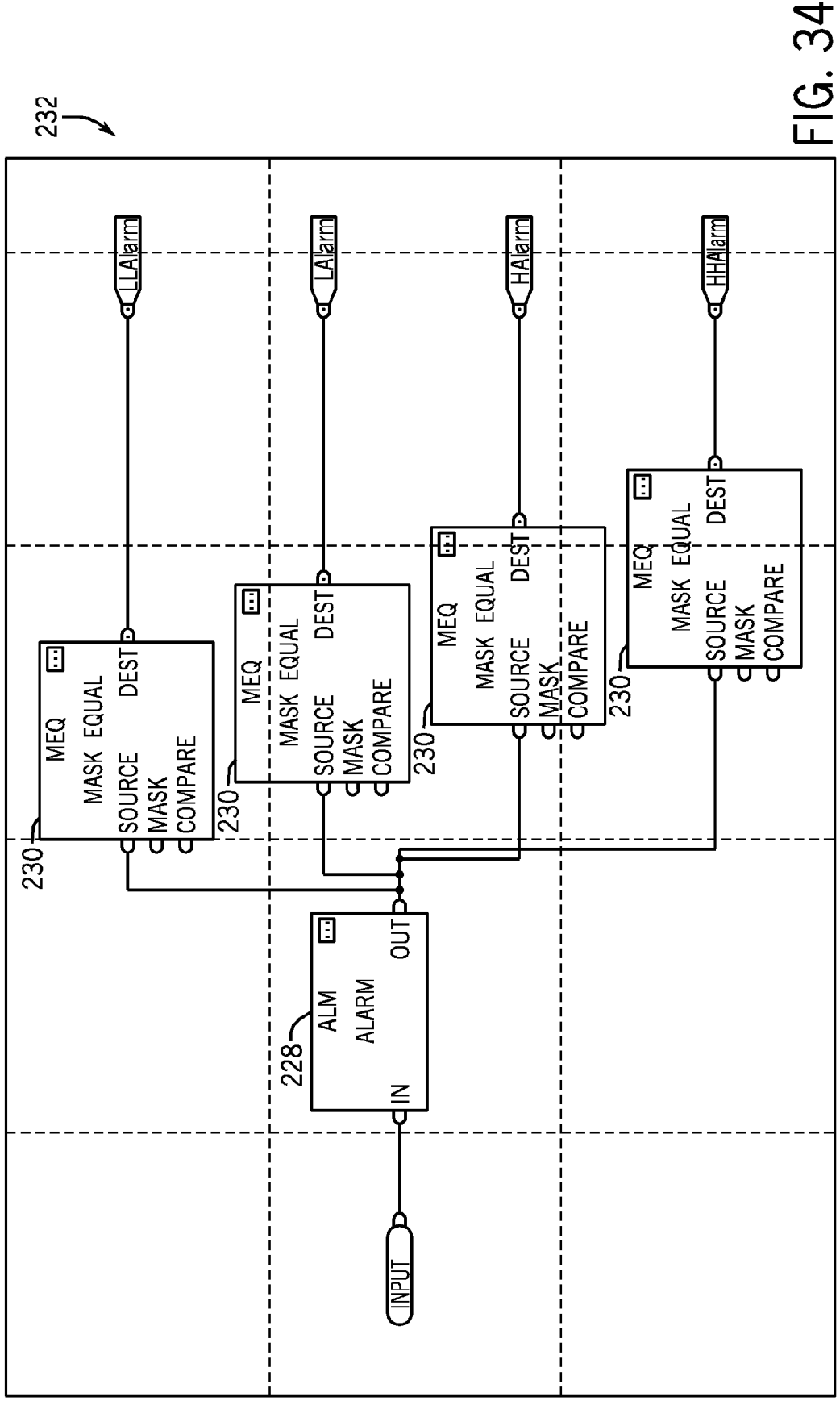
FIG. 34 is an exemplary embodiment of the logic of a Composite Alarm macro function block.
Figure 35:
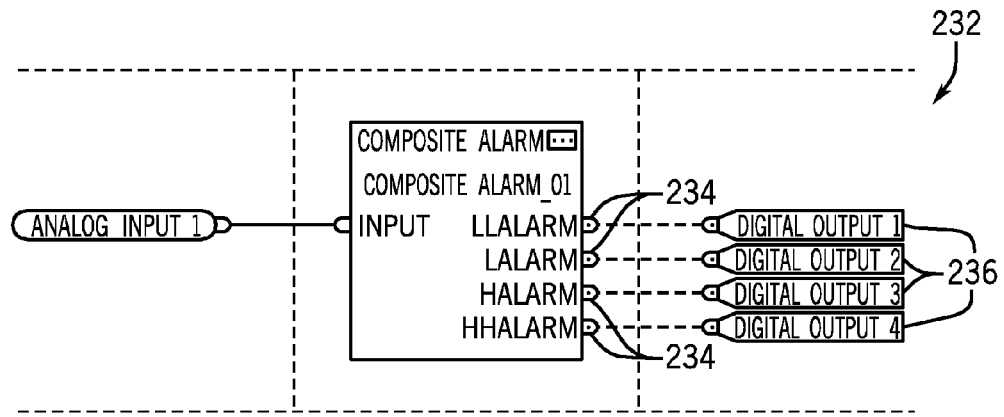
FIG. 35 is an exemplary embodiment of the Composite Alarm macro function block.

FIG. 33 is a partial screenshot of the browser 64 illustrating an exemplary Alarm function block 228 being used with a Mark Equal (MEQ) function block 230. In this application, when the designer 62 wants to filter the particular Alarm bit from this output of the Alarm function block 228, the additional MEQ function block 230 would be applied. For instance, if the designer 62 only intends to have the HAlarm signal to be used as one output for hardware (e.g., Digital Output1) when the value of Analog Input 1 is evaluated as the data source, the logic and parameter settings for the MEQ function block 230 may be constructed as illustrated. A more general case may be to separately output all individual alarm bits from the output of the Alarm function block 228. As described herein, the Macro function block functionality may be utilized to design an integrated Macro function block 76 to implement this functionality. For example, this Macro function block 76 may be named Composite Alarm. FIG. 34 is an exemplary embodiment of the logic of a Composite Alarm macro function block 232. As illustrated, the Composite Alarm macro function block 232 may include the Alarm function block 228 and four MEQ function blocks 230, which correspond to each of the bit outputs (e.g., HHLimit, HLimit, LLimit, and LLLimit) of the Alarm function block 228. FIG. 35 is an exemplary embodiment of the Composite Alarm macro function block 232, which may be used in the main logic with each alarm bit output 234 connected to one digital output 236. The Composite Alarm macro function block is merely representative of the way the Macro function block functionality described herein may be implied, and is not intended to be limiting.

Figure 36:
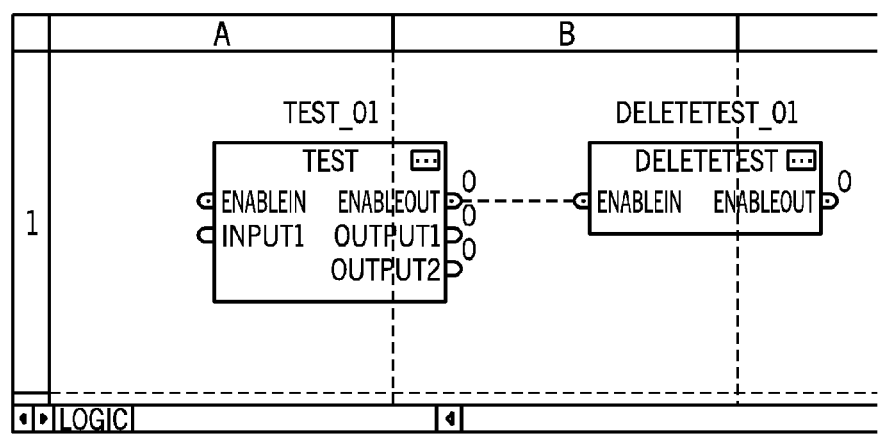
FIG. 36 illustrates exemplary nesting of multiple Macro function blocks.
Figure 37:
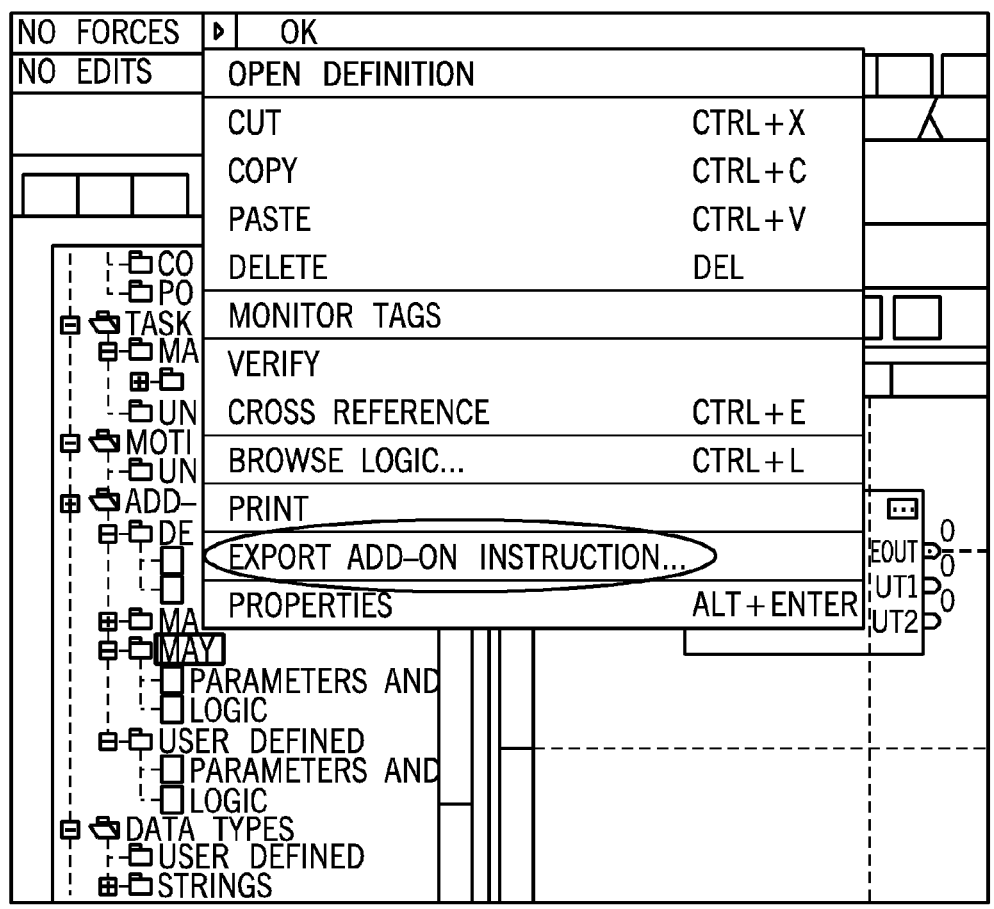
FIG. 37 is a partial screenshot of the browser, illustrating how Export/Import instructions may be selected by the designer.

Nesting Macro function blocks 76 is an important feature. FIG. 36 illustrates exemplary nesting of multiple Macro function blocks 76. Export/Import of Macro function blocks 76 is also an important feature. FIG. 37 is a partial screenshot of the browser 64, illustrating how the Export/Import instructions may be selected by the designer 62.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for distributed control of a process, comprising:
   accessing a macro creation module in a design environment;
   accessing a plurality of function blocks configured to execute desired arithmetic and/or logical operations based upon inputs to generate outputs, wherein the inputs and outputs comprise at least one Boolean input or output and at least one analog input or output;
   creating a macro through manipulation of graphical representations of the function blocks displayed via the macro creation module in the design environment to encapsulate multiple function blocks of the plurality of function blocks into a single set of add-on instructions, wherein at least one of the inputs and at least one of the outputs of the multiple function blocks are mapped to inputs and outputs of the macro;
   configuring the macro for a particular automation process;
   downloading the macro into a low-level distributed automation device; and
   storing the macro for subsequent use as the single set of add-on instructions in another design environment to configure another low-level distributed automation device.

2. The method of claim 1, wherein the function blocks comprise non-transitory code configured in an object oriented programming language.

3. The method of claim 1, wherein the low-level distributed automation device is an input/output terminal block.

4. The method of claim 1, wherein the low-level distributed automation device is a push-button block.

5. The method of claim 1, wherein the low-level distributed automation device is a relay.

6. The method of claim 1, wherein the low-level distributed automation device is a motor drive or motor starter.

7. The method of claim 1, wherein configuring the macro comprises configuring at least one memory register from which the function blocks read at least one input.

8. The method of claim 1, wherein configuring the macro comprises configuring at least one memory register to which the function blocks write at least one output.

9. The method of claim 1, wherein during operation, the low-level distributed automation device is coupled to an automation controller via a network, but receives at least one input and generates at least one output based upon the macro without command from the automation controller.

10. The method of claim 1, wherein the macro is created on a configuration station in the design environment.

11. The method of claim 1, comprising uploading the macro from the low-level distributed automation device to a configuration station.

12. A low-level distributed automation control device, comprising:
   a memory circuit storing a macro comprising a plurality of function blocks configured to execute desired arithmetic and/or logical operations based upon inputs to generate outputs, the macro being configured for a particular automation process, wherein the inputs and outputs comprise at least one Boolean input or output and at least one analog input or output, and wherein the macro is configured by a macro creation module storing the macro for subsequent use as a single set of add-on instructions during subsequent configuration of other low-level distributed automation control devices;
   a processor configured to execute the macro; and
   an interface configured to output an output based upon the macro executed by the processor;
   wherein the low-level distributed automation control device is an input/output terminal block, a push-button block, a relay, a motor drive, or a motor starter.

13. The device of claim 12, wherein the low-level distributed automation control device is the input/output terminal block.

14. The device of claim 12, wherein the low-level distributed automation control device is the push-button block.

15. The device of claim 12, wherein the low-level distributed automation control device is the relay.

16. The device of claim 12, wherein the low-level distributed automation control device is the motor drive or motor starter.

17. A distributed control system, comprising:
   a low-level distributed automation control device comprising a memory circuit storing a macro comprising a plurality of function blocks configured to execute desired arithmetic and/or logical operations based upon inputs to generate outputs, the macro being configured for a particular automation process, a processor configured to execute the macro, and an interface configured to output an output based upon the macro executed by the processor, wherein the inputs and outputs comprise at least one Boolean input or output and at least one analog input or output, and wherein the macro is configured by a macro creation module storing the macro for subsequent use as a single set of add-on instructions during subsequent configuration of other low-level distributed automation control devices; and
   an automation controller coupled to the low-level distributed automation control device via a network;
   wherein the low-level distributed automation control device is configured to communicate with the automation controller via the network, but receives the inputs and outputs the generated outputs without command from the automation controller, and wherein the low-level distributed automation control device is an input/output terminal block, a push-button block, a relay, a motor drive, or a motor starter.

18. The system of claim 17, wherein the low-level distributed automation control device is the input/output terminal block.

19. The system of claim 17, wherein the low-level distributed automation control device is the push-button block.

20. The system of claim 17, wherein the low-level distributed automation control device is the relay.

21. The system of claim 17, wherein the low-level distributed automation control device is the motor drive or motor starter.

* * * * *